United States Patent
Ichikawa

(10) Patent No.: US 12,417,057 B2
(45) Date of Patent: Sep. 16, 2025

(54) PRINTING AUTHORITY MANAGEMENT SYSTEM, PRINTING APPARATUS, AND NON-TRANSITORY COMPUTER READABLE STORAGE MEDIUM

(71) Applicant: BROTHER KOGYO KABUSHIKI KAISHA, Nagoya (JP)

(72) Inventor: Yushi Ichikawa, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 76 days.

(21) Appl. No.: 18/494,687

(22) Filed: Oct. 25, 2023

(65) Prior Publication Data
US 2024/0143250 A1 May 2, 2024

(30) Foreign Application Priority Data
Oct. 28, 2022 (JP) .................................. 2022-173134

(51) Int. Cl.
*G06F 3/12* (2006.01)

(52) U.S. Cl.
CPC .......... *G06F 3/1239* (2013.01); *G06F 3/1204* (2013.01); *G06F 3/1273* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 6,863,364 B2* | 3/2005 | Russell | ............. | G03G 15/0856 399/24 |
| 2011/0191197 A1* | 8/2011 | VanWinkle | ............. | G06Q 40/12 705/26.1 |
| 2017/0161719 A1* | 6/2017 | Bhatia | .................. | G06Q 20/327 |
| 2020/0201227 A1* | 6/2020 | Sato | .................... | G03G 15/5079 |
| 2020/0211091 A1* | 7/2020 | Matsumoto | .......... | G06K 15/407 |
| 2021/0240401 A1* | 8/2021 | Nagasaki | ............. | G06F 3/1288 |
| 2022/0057973 A1* | 2/2022 | Saito | ....................... | G06F 3/121 |

(Continued)

FOREIGN PATENT DOCUMENTS

JP 2021-18621 A 2/2021
JP 2021-68372 A 4/2021

*Primary Examiner* — Helen Zong
(74) *Attorney, Agent, or Firm* — KENEALY VAIDYA LLP

(57) ABSTRACT

A printing authority management system includes a terminal device, a printing apparatus, and an information management device configured to communicate with the printing apparatus and the terminal device via a network, and manage the printing apparatus and increase an allowable printing amount of the printing apparatus in accordance with a predetermined guaranteed printing amount guaranteed by a printing authority acquired from an expense of a user. The printing authority management system includes a storage that stores a threshold and one or more processors. The one or more processors are configured to: execute automatic purchase of the printing authority in response to satisfaction of a threshold condition based on the threshold; grant the automatically purchased printing authority to the user or the printing apparatus; and add the guaranteed printing amount corresponding to the granted printing authority to the allowable printing amount of the printing apparatus.

14 Claims, 19 Drawing Sheets

(56) References Cited

U.S. PATENT DOCUMENTS

| | | | |
|---|---|---|---|
| 2022/0137891 A1* | 5/2022 | Kawaguchi | B41J 29/38 |
| | | | 358/1.14 |
| 2022/0237687 A1* | 7/2022 | Yasui | G06Q 30/0635 |
| 2023/0138618 A1* | 5/2023 | Harada | G06F 3/1204 |
| | | | 358/1.15 |

* cited by examiner

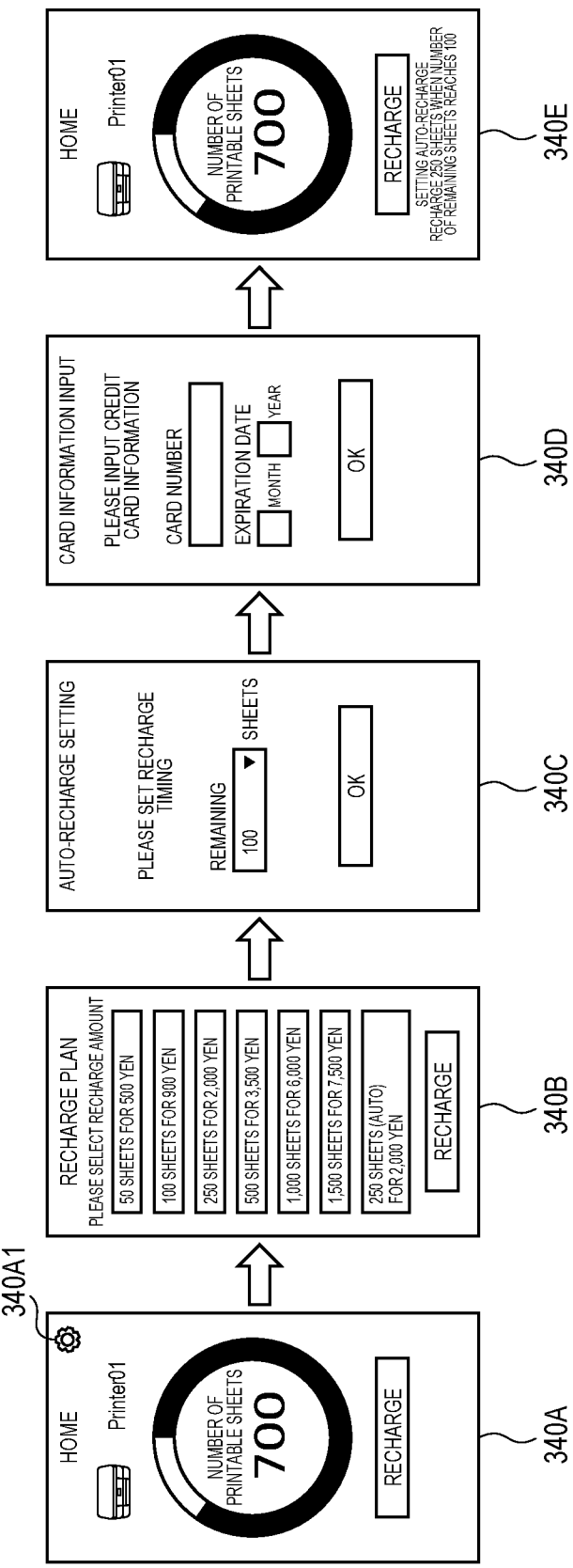

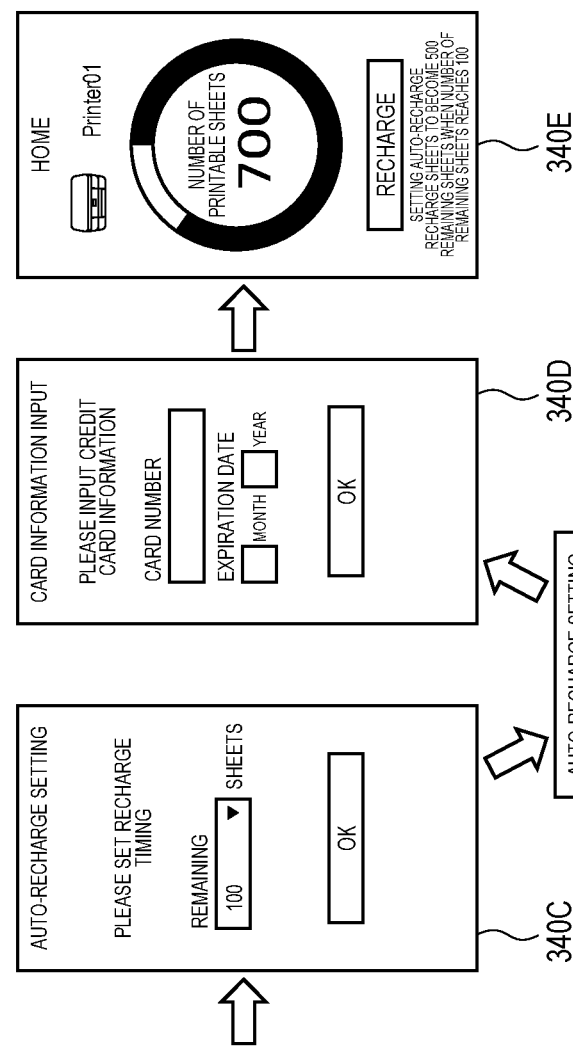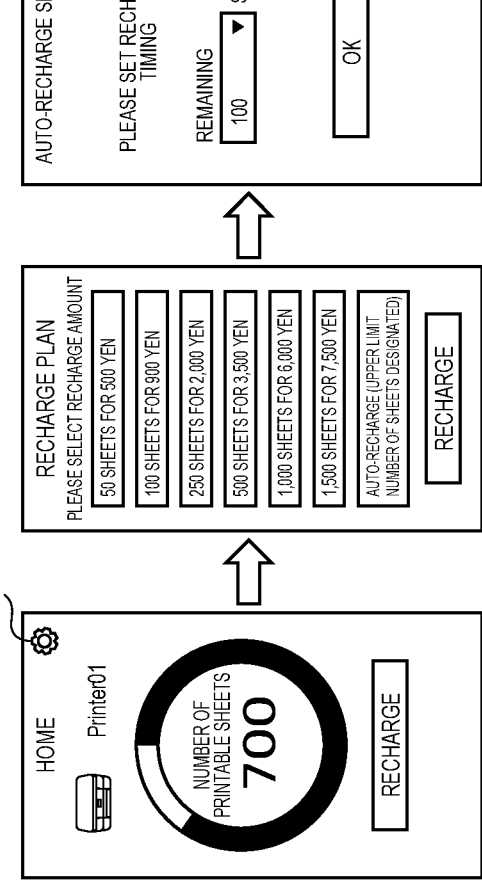

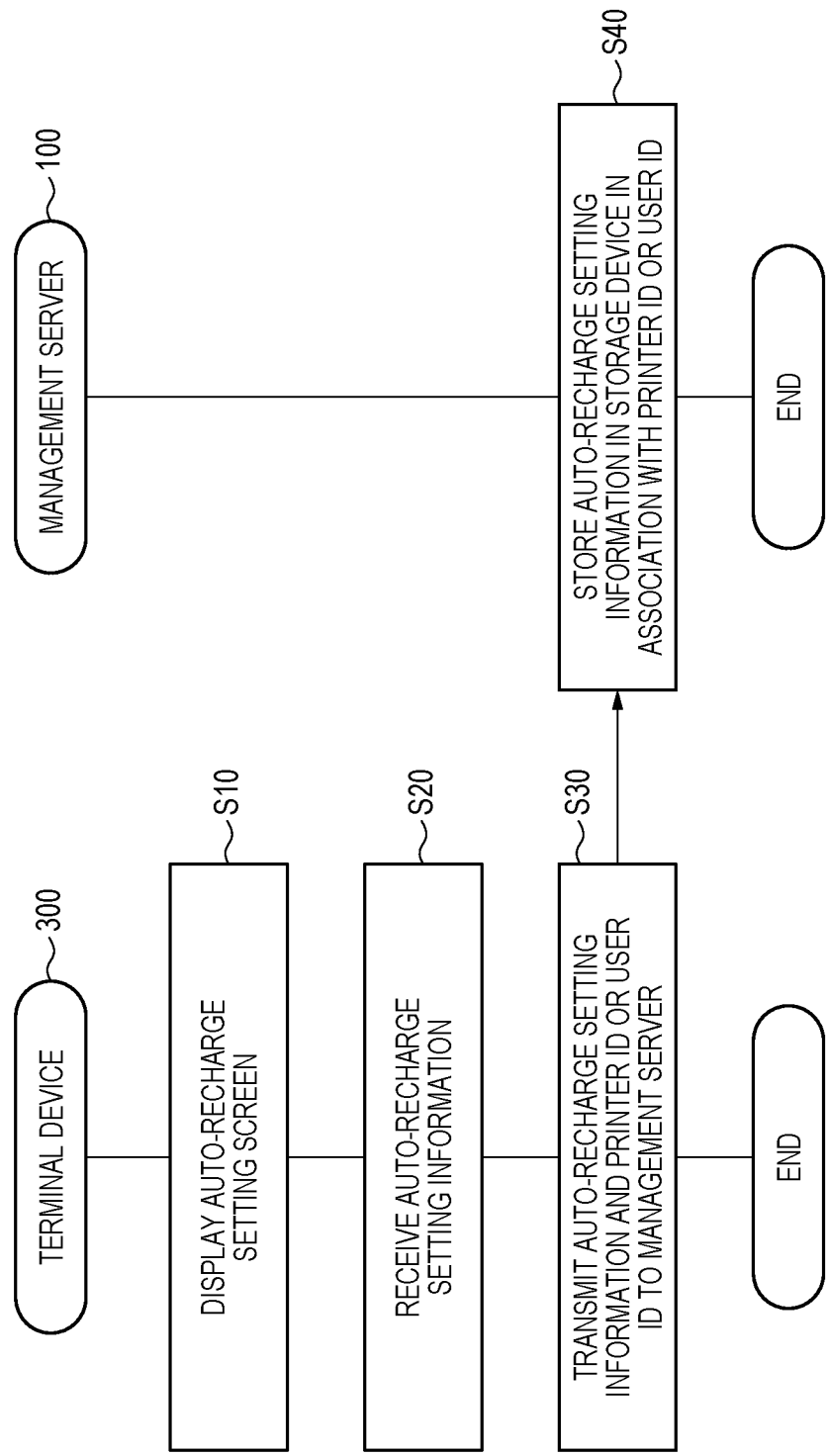

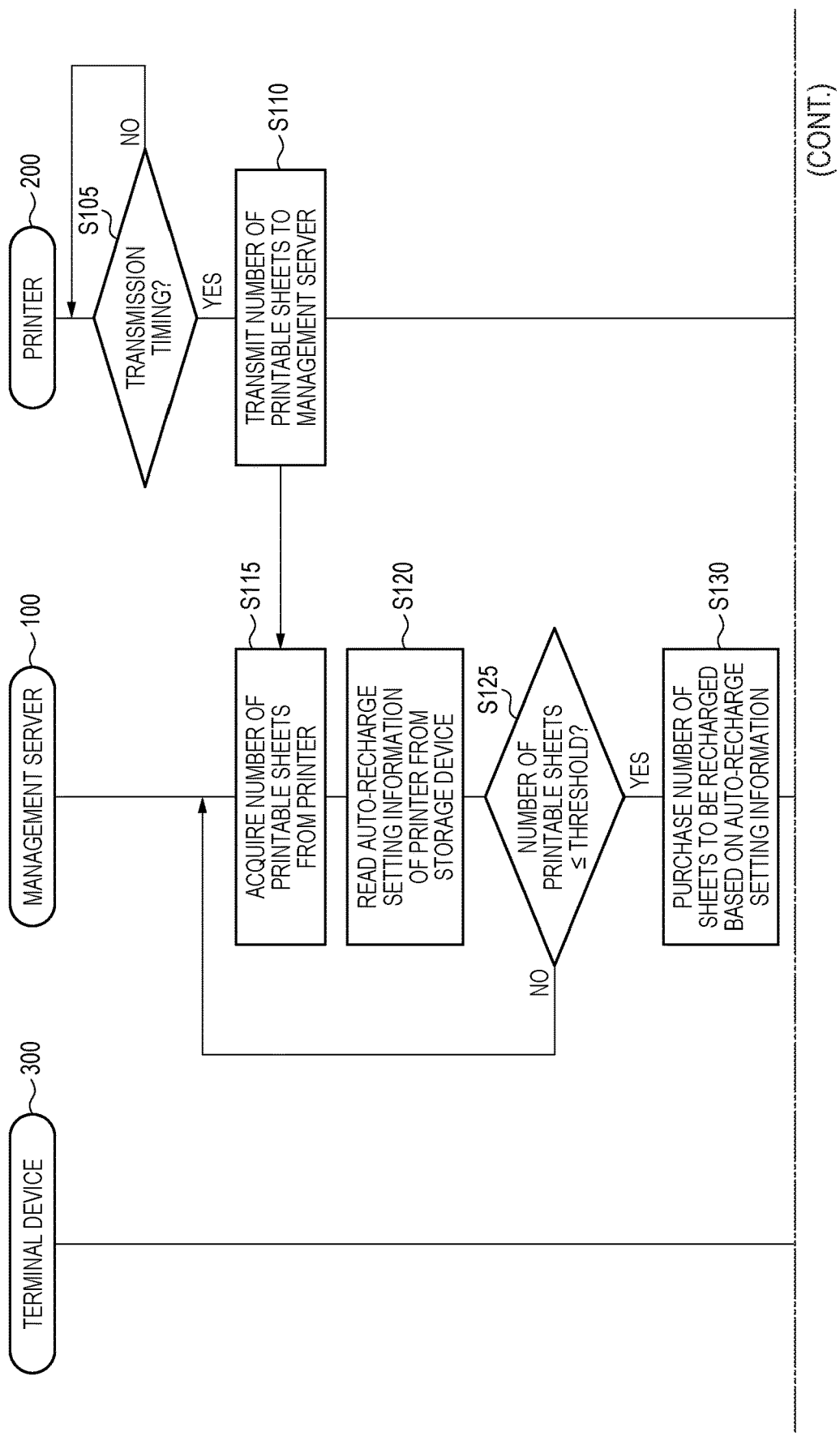

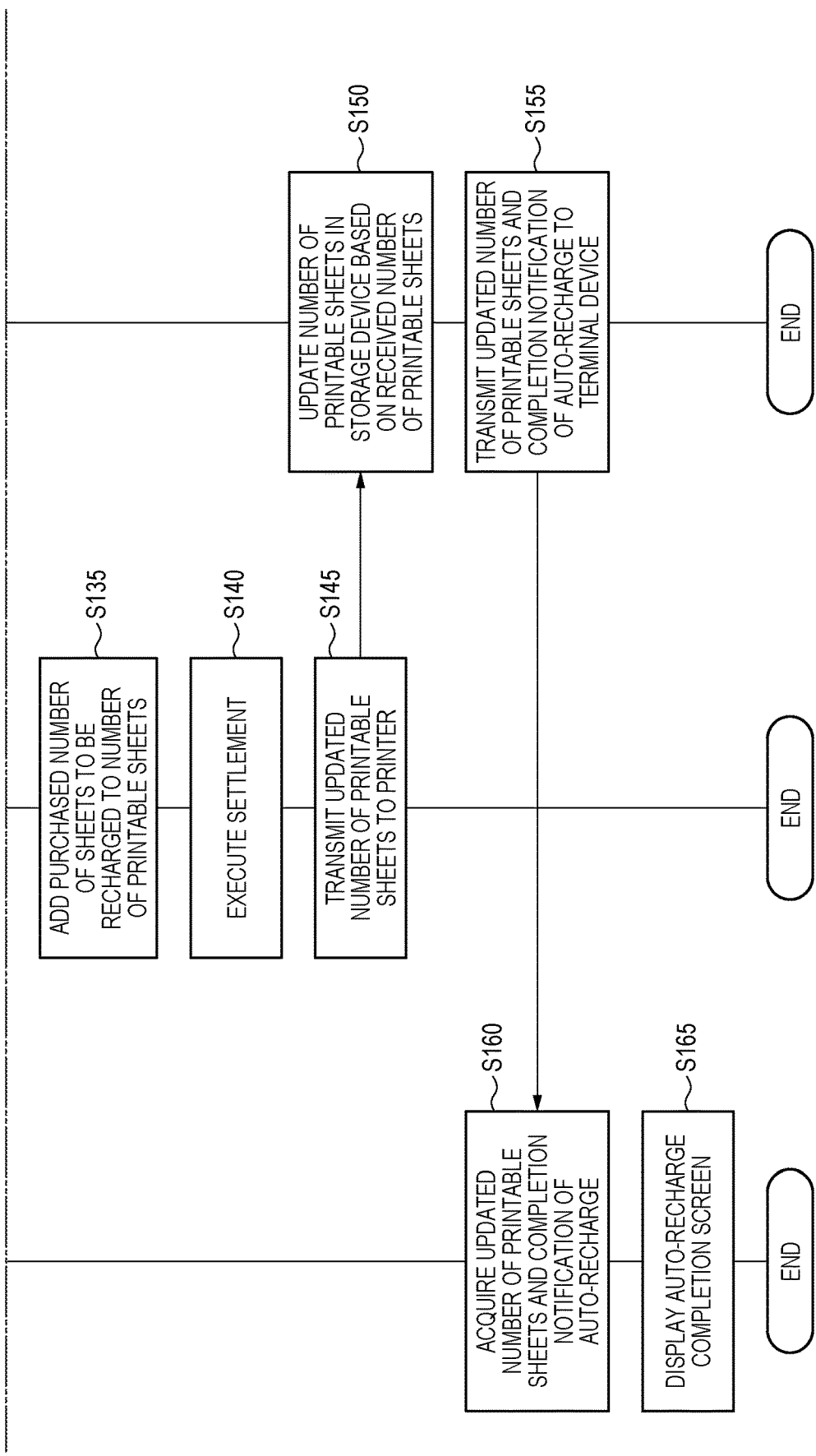

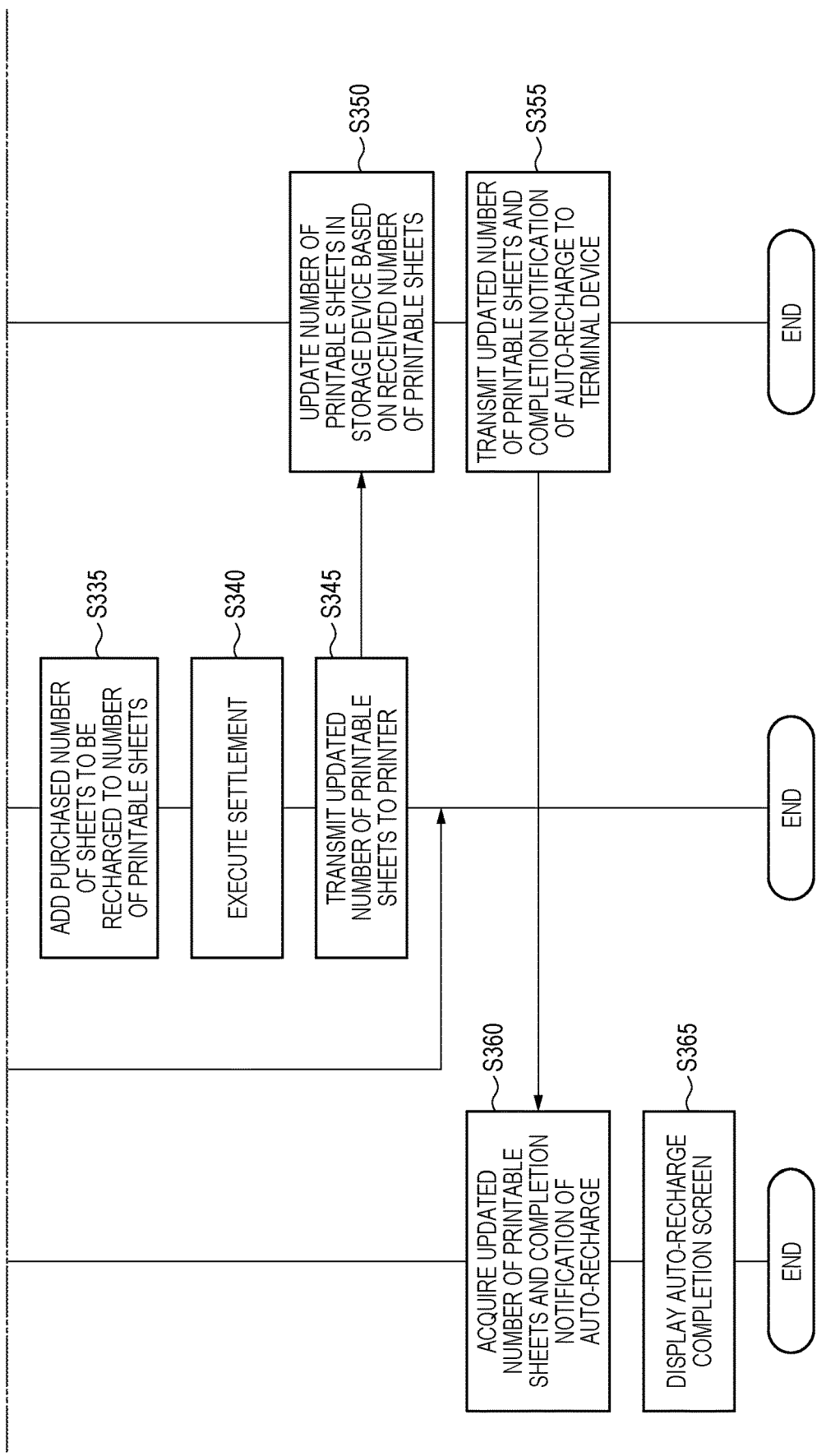

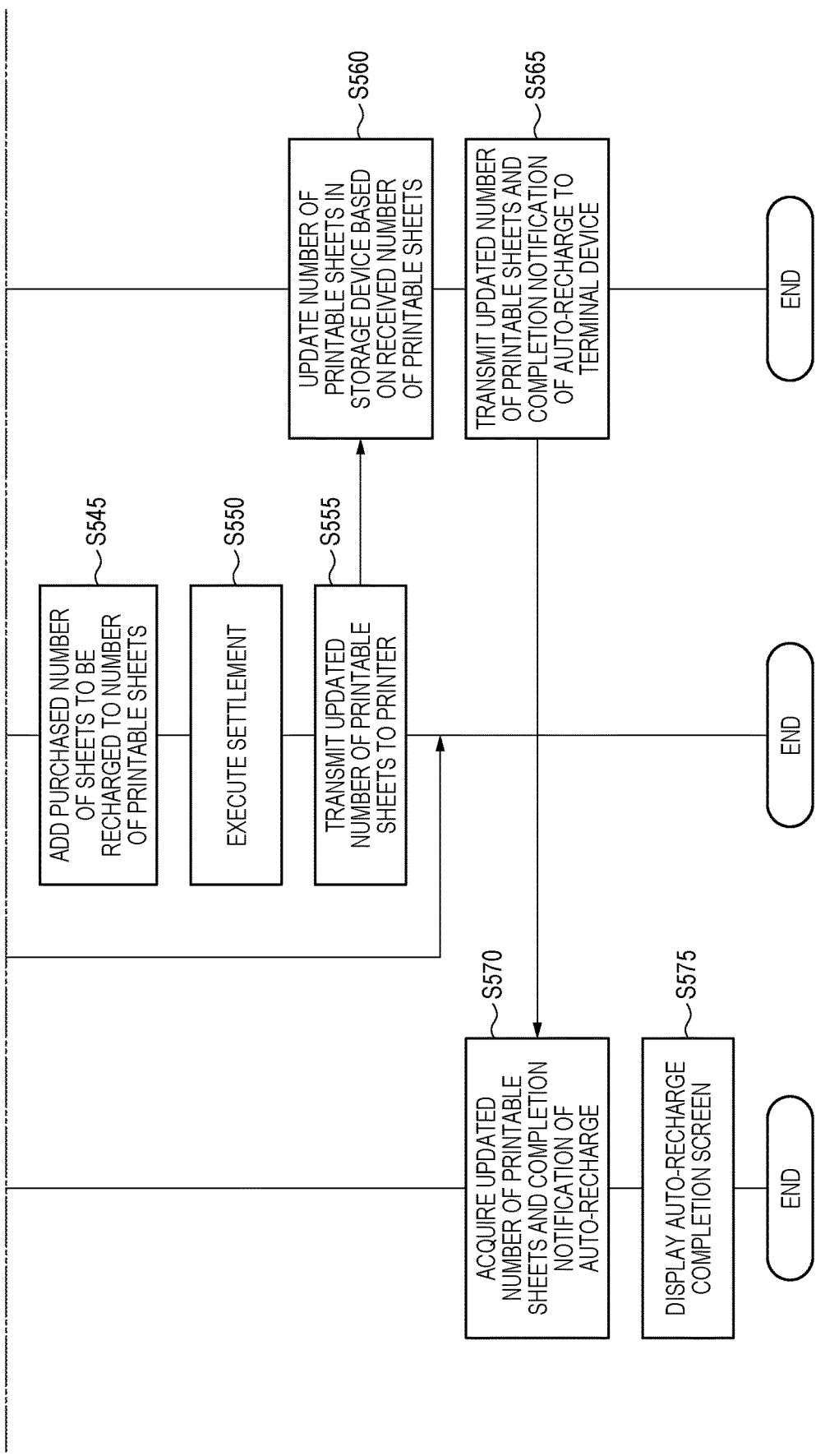

| NUMBER OF PRINTED SHEETS IN LAST 3 DAYS | THRESHOLD (NUMBER OF PRINTABLE SHEETS) FOR AUTO-RECHARGE |
|---|---|
| 100 SHEETS OR LESS | 100 SHEETS |
| 101 SHEETS TO 200 SHEETS OR LESS | 200 SHEETS |
| 201 SHEETS TO 300 SHEETS OR LESS | 300 SHEETS |
| … | … |

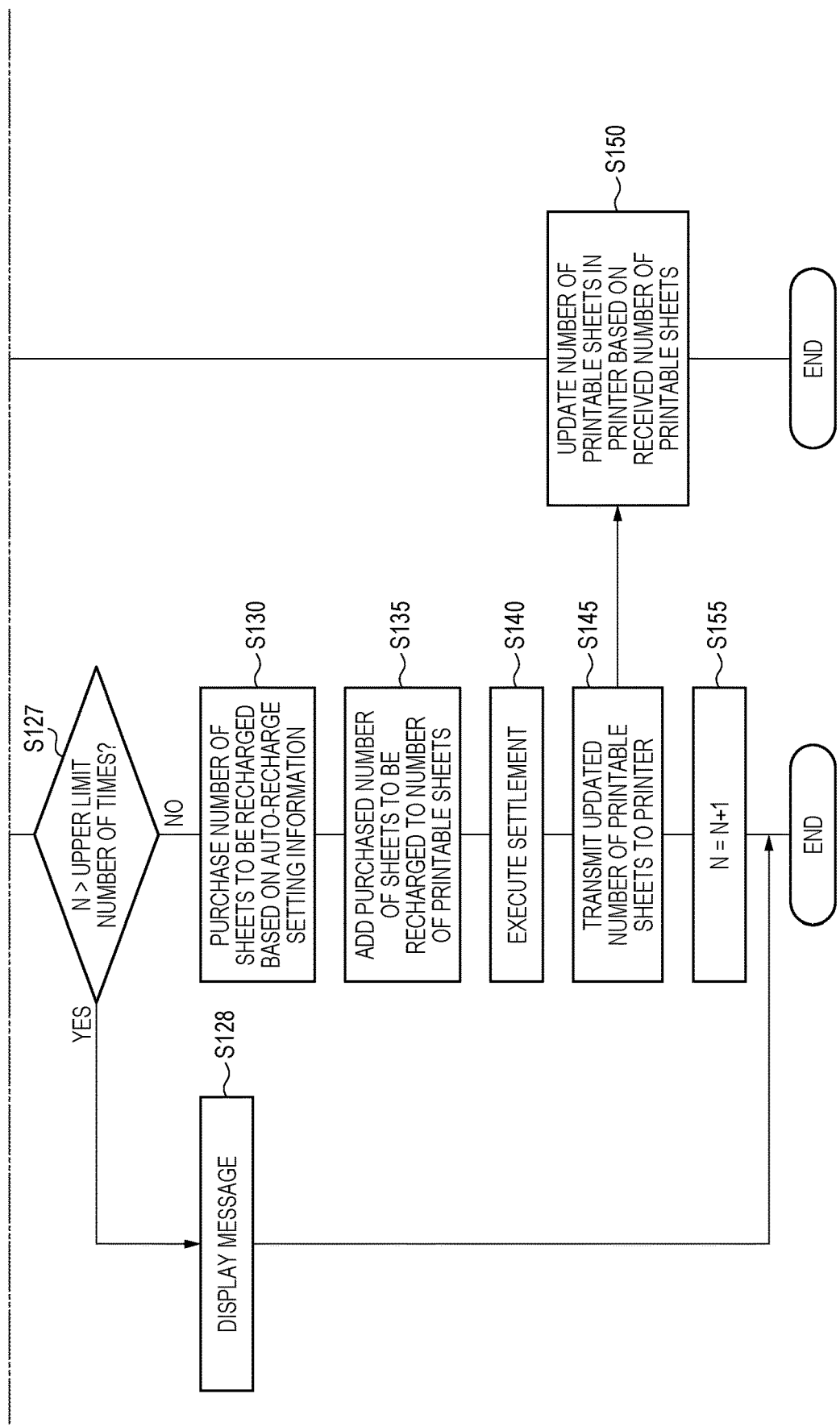

PRINTING AUTHORITY MANAGEMENT SYSTEM, PRINTING APPARATUS, AND NON-TRANSITORY COMPUTER READABLE STORAGE MEDIUM

REFERENCE TO RELATED APPLICATIONS

This application claims priority from Japanese Patent Application No. 2022-173134 filed on Oct. 28, 2022. The entire content of the priority application is incorporated herein by reference.

BACKGROUND ART

The present disclosure relates to a printing authority management system for managing a printing authority in a printing apparatus, a printing apparatus, and a non-transitory computer readable storage medium storing a printing authority management program.

A prepaid fee system may be introduced in a printing service in which a user who uses a printing apparatus pays charged fee to a service provider according to a printing content. In an example of the related art, a user purchases a printing authority for a fee to be allowed to perform printing up to a predetermined printing amount guaranteed by the purchased printing authority.

DESCRIPTION

In the related art described above, when printing processing based on the guaranteed printing amount guaranteed by the printing authority is completed and an allowable printing amount, which is an upper limit that is printable by the printing apparatus, becomes zero, the user is able to continue printing by purchasing a new printing authority and adding a guaranteed printing amount guaranteed by the printing authority to increase the allowable printing amount.

However, if a user, who performs printing based on a guaranteed printing amount by a prepaid system, frequently makes additional purchases of the above-described printing authority, time and effort required for the user will increase.

An object of the present disclosure to provide a printing authority management system, a printing apparatus, and a non-transitory computer readable storage medium storing a printing authority management program for a printing authority capable of reducing the time and effort to additionally purchase a printing authority based on a prepaid system and improving convenience.

The present disclosure provides a printing authority management system including: a terminal device; a printing apparatus configured to print an image on a sheet; an information management device including: a communication interface configured to communicate with the printing apparatus and the terminal device via a network, and a controller configured to manage the printing apparatus and increase an allowable printing amount of the printing apparatus in accordance with a predetermined guaranteed printing amount guaranteed by a printing authority acquired from an expense of a user; a storage that stores a threshold; and one or more processors configured to: perform automatic purchasing processing to execute automatic purchase of the printing authority in response to satisfaction of a threshold condition based on the threshold stored in the storage; perform printing authority granting processing to grant the printing authority automatically purchased by the automatic purchasing processing to the user or the printing apparatus; and perform allowable printing amount adding processing to add the guaranteed printing amount corresponding to the printing authority granted by the printing authority granting processing to the allowable printing amount of the printing apparatus.

The printing authority management system of the present disclosure includes a terminal device, an information management device, and a printing apparatus, and manages the printing apparatus. The user is able to execute printing by acquiring a printing authority aquired from an expense, that is, by a prepaid system. The printing apparatus is configured to execute printing up to the allowable printing amount as an upper limit. The controller of the information management device is capable of increasing the allowable printing amount in accordance with the predetermined guaranteed printing amount guaranteed by the printing authority acquired by the user.

The printing authority management system of the present disclosure includes one or more processors configured to perform the automatic purchasing processing, the printing authority granting processing, and the allowable printing amount adding processing.

As printing is executed sequentially, the allowable printing amount, which is an upper limit printable by the printing apparatus, decreases. In response to satisfaction of the threshold condition stored in advance in the storage as the allowable printing amount decreases, automatic purchase of the printing authority is performed by the automatic purchasing processing, and the printing authority is automatically purchased. The automatically purchased printing authority is granted to the user or the printing apparatus by the printing authority granting processing. By adding the guaranteed printing amount corresponding to the automatically purchased printing authority to the allowable printing amount by the allowable printing amount adding processing. Consequently, the upper limit of a subsequent printable amount of the printing apparatus can be increased.

According to the present disclosure, since the printing authority is automatically purchased in a prepaid way based on the satisfaction of the predetermined threshold condition. Consequently, for example, it is possible to reduce the time and effort for the user to additionally purchase the printing authority by manually purchase, and improve convenience.

The present disclosure provides a printing apparatus configured to execute printing up to an allowable printing amount, increase the allowable printing amount in accordance with a predetermined guaranteed printing amount guaranteed by a printing authority acquired from an expense of a user, the printing apparatus, and communicate with an information management device and a terminal device, the information management device being configured to execute automatic purchase of the printing authority, the printing apparatus including: a printing unit; a storage that stores a threshold; and a controller, wherein the controller is configured to execute: determination processing of determining whether the allowable printing amount is equal to or less than the threshold stored in the storage; notification transmission processing of transmitting a third request notification requesting the automatic purchase to the information management device in response to a determination in the determination processing that the allowable printing amount is equal to or less than the threshold; and allowable printing amount acquisition processing of acquiring the allowable printing amount added with the guaranteed printing amount corresponding to the printing authority automatically purchased in response to the third request notification in the notification transmission processing.

The present disclosure provides a non-transitory computer readable storage medium storing a printing authority management program for a terminal device, the terminal device including a processor and a storage that stores a threshold, the terminal device being configured to communicate with a printing apparatus and an information management device, the printing apparatus being configured to execute printing up to an allowable printing amount and increase the allowable printing amount in accordance with a predetermined guaranteed printing amount guaranteed by a printing authority acquired from an expense of a user, the information management device being configured to execute automatic purchase of the printing authority, the printing authority management program including instructions that, when executed by the processor, causing the processor to execute: acquiring, at a predetermined interval, the allowable printing amount at a current point of time from the printing apparatus, determining whether the acquired allowable printing amount is equal to or less than the threshold stored in the storage, and transmitting a fourth request notification requesting the automatic purchase to the information management device in response to a determination in the determination step that the allowable printing amount is equal to or less than the threshold.

The technique disclosed in the present description can be implemented in various ways, and can be implemented by, for example, data processing methods and data processing apparatus, server systems for processing data, computer programs for implementing functions of these methods or apparatus, and for example, a non-transitory recording medium in which the computer programs are recorded.

The present disclosure can reduce the time and effort to additionally purchase the printing authority based on the prepaid system, and improve the convenience.

FIGS. 4A to 4E are diagrams showing an example of screen transition displayed on a touchscreen when setting a threshold in the terminal device;

FIGS. 5A to 5F are diagrams showing another example of screen transition displayed on the touchscreen when setting the threshold in the terminal device;

FIG. 7 is a sequence chart showing an example of a control procedure executed by a CPU of the terminal device and a processor of the management server when the threshold is set by the terminal device and stored in the management server in the first embodiment;

Figure 9:
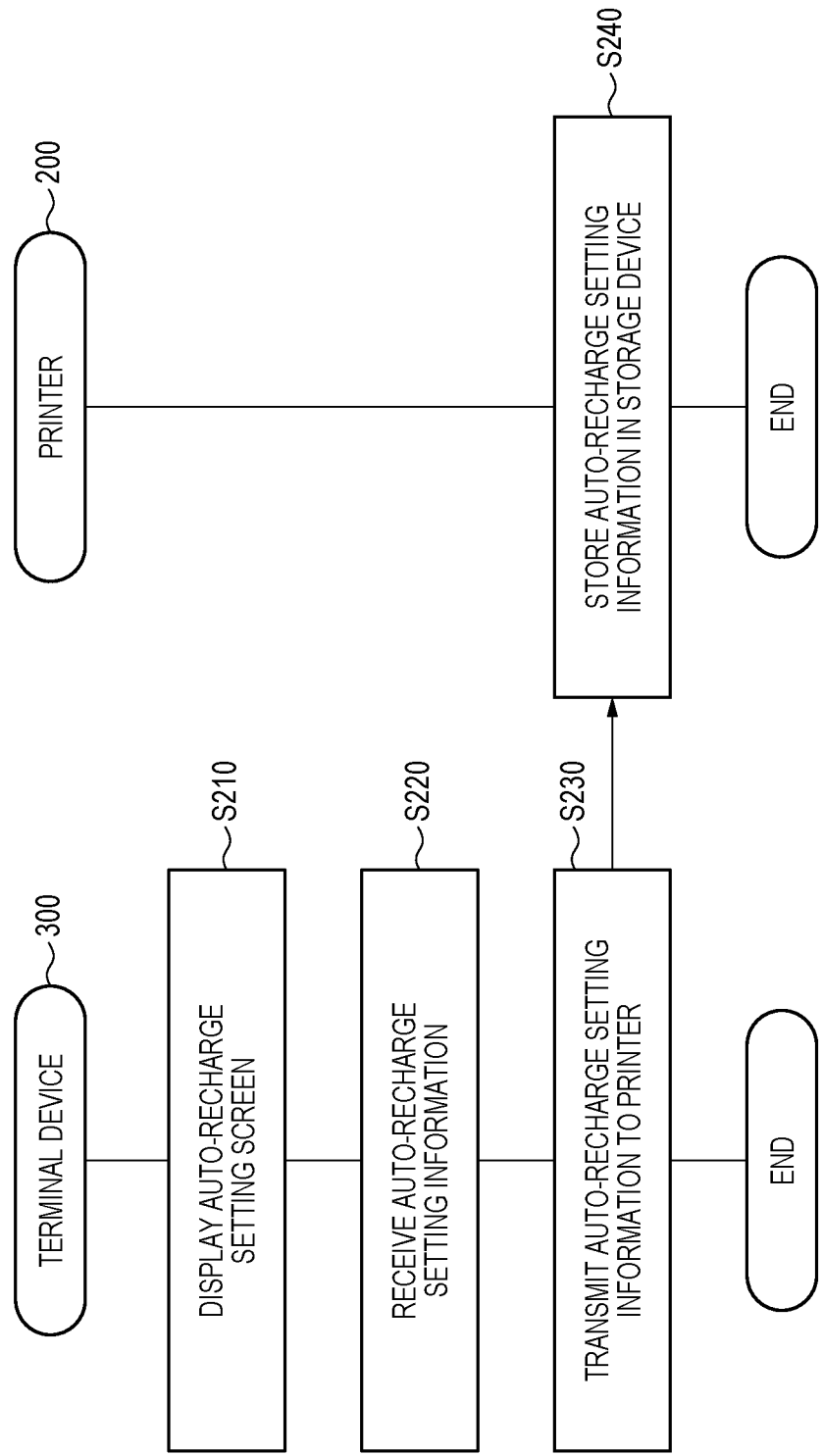
Figure 10:
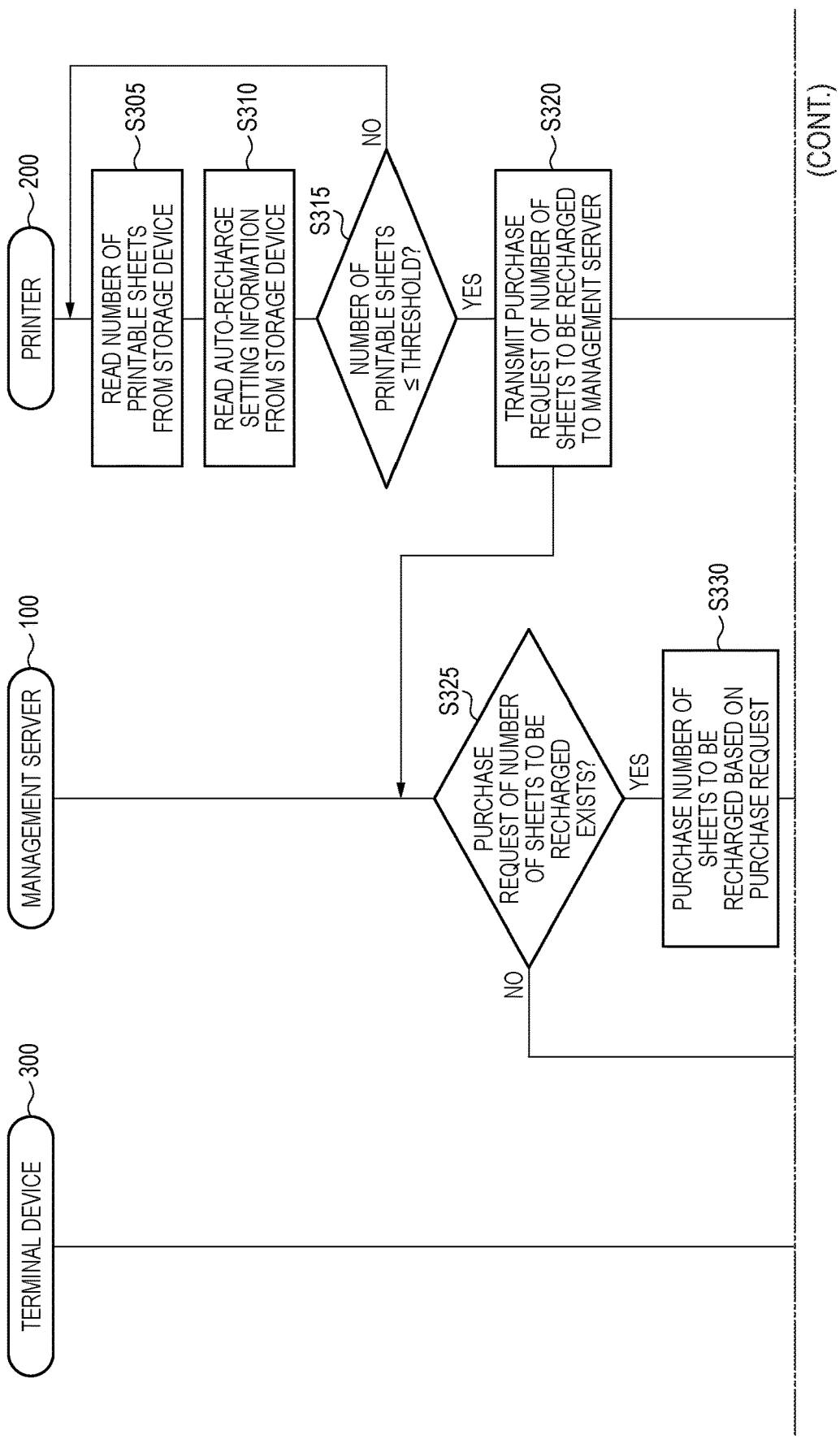
Figure 11:
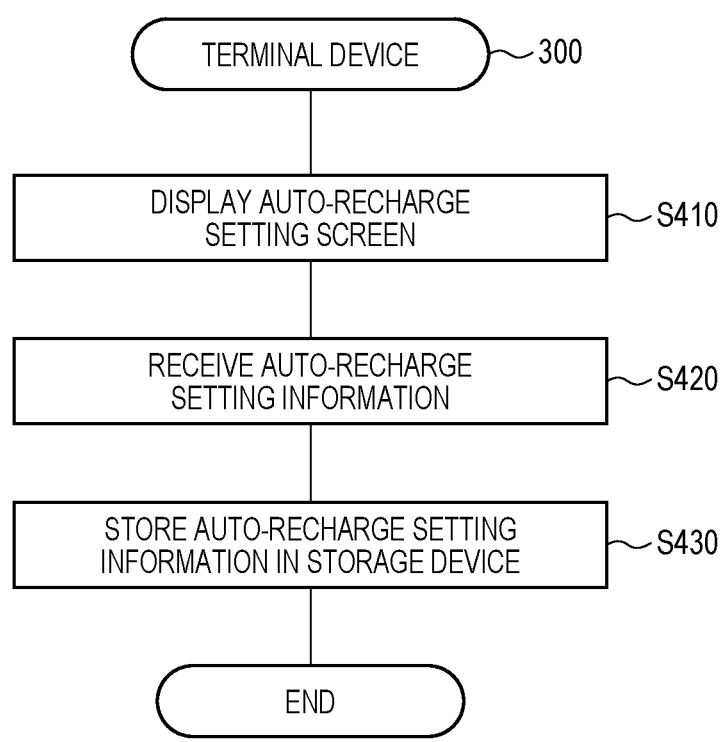
Figure 12:
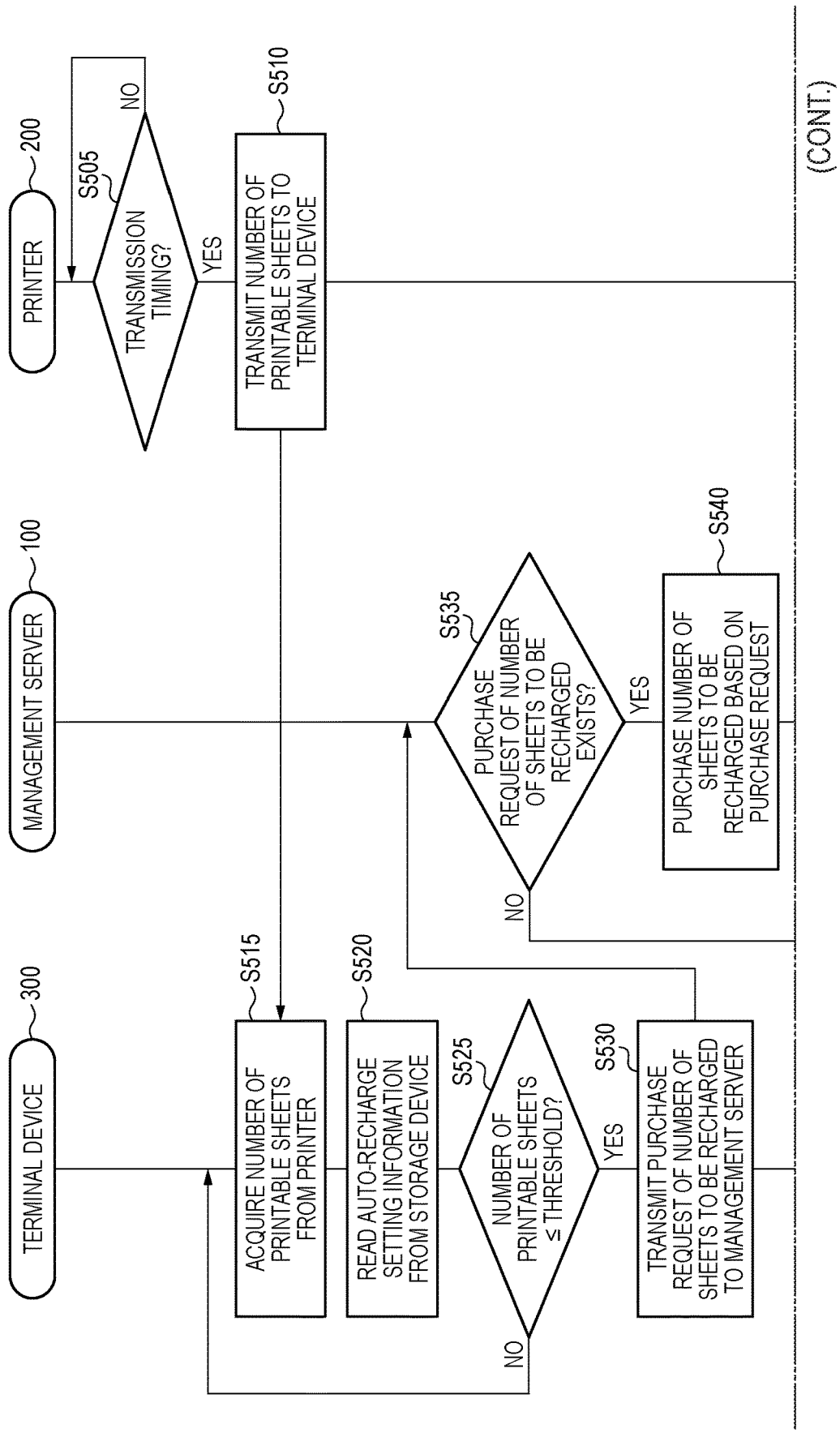
Figures 13, 14:
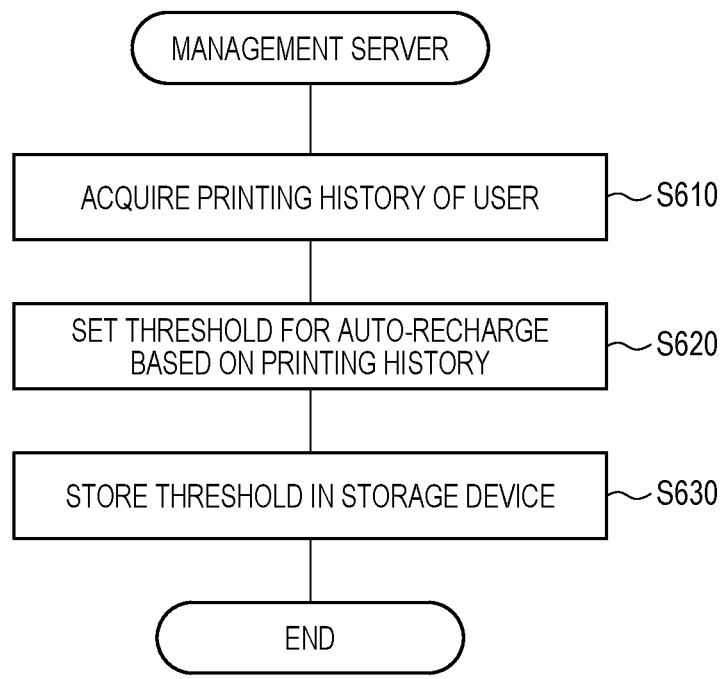
Figure 15:
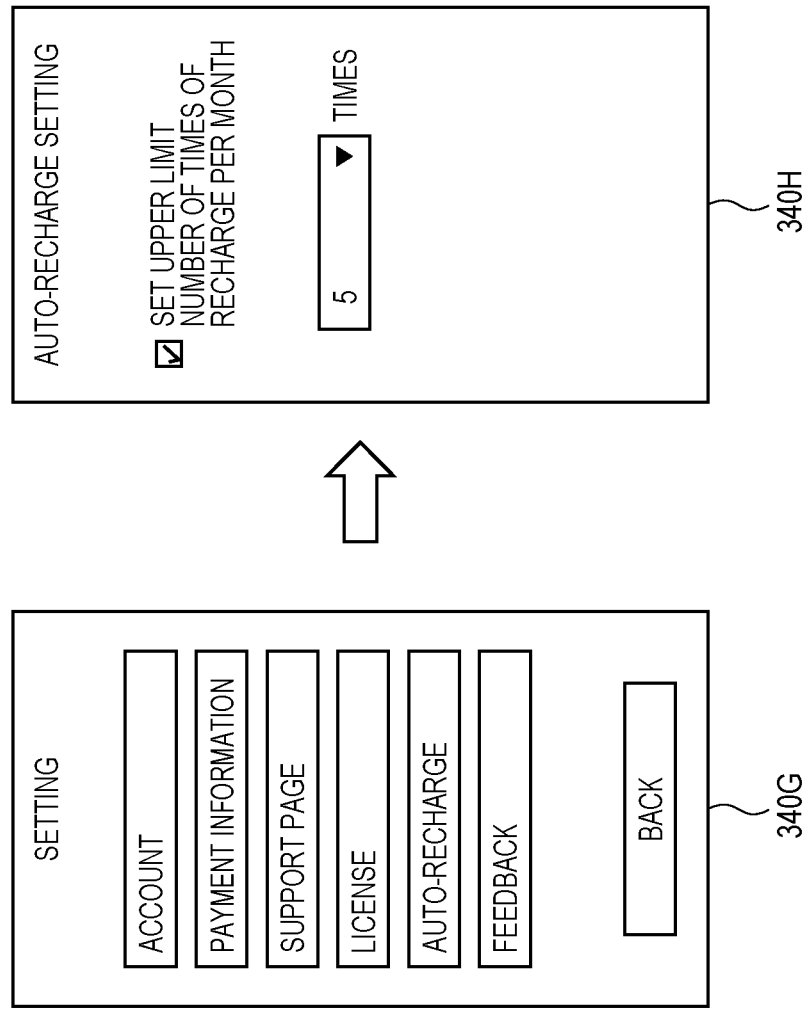
Figure 16:
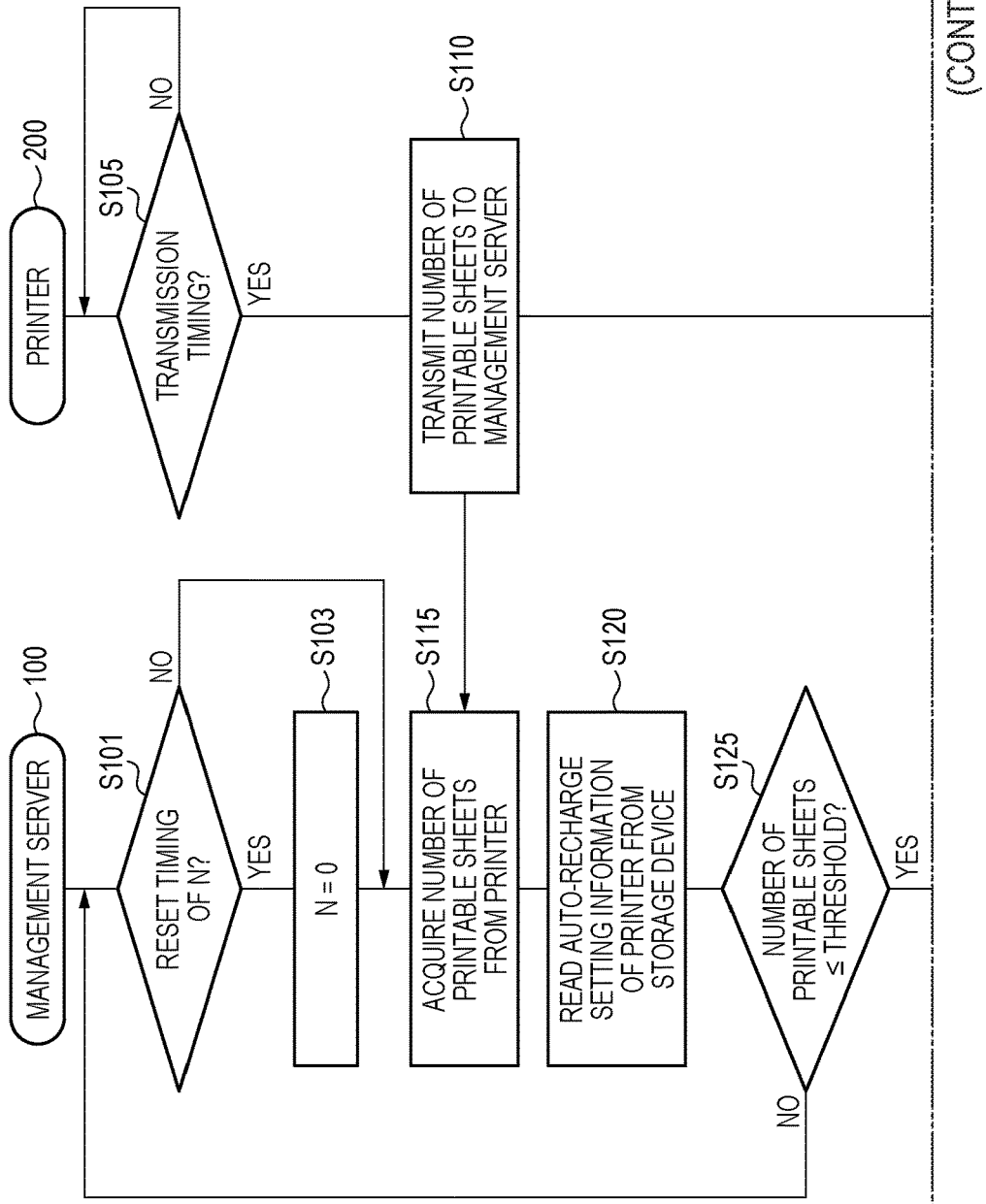

FIG. 8 is a sequence chart showing an example of a control procedure executed by the processor of the management server, a processor of a printer, and the CPU of the terminal device in the case where in the first embodiment, the management server determines whether a threshold condition is satisfied based on the number of printable sheets transmitted from the printer and the threshold held by the management server, and executes auto-recharge when the threshold condition is satisfied;

FIG. 9 is a sequence chart showing an example of a control procedure executed by the CPU of the terminal device and the processor of the printer when the threshold is set by the terminal device and stored in the printer in a second embodiment;

FIG. 10 is a sequence chart showing an example of a control procedure executed by the processor of the management server, the processor of the printer, and the CPU of the terminal device in the case where in the second embodiment, the printer determines whether the threshold condition is satisfied based on the number of printable sheets and the threshold held by the printer, and transmits a request for auto-recharge to the management server when the threshold condition is satisfied;

FIG. 11 is a flowchart showing an example of a control procedure executed by the CPU of the terminal device when the threshold is stored in the terminal device in a third embodiment;

FIG. 12 is a sequence chart showing an example of a control procedure executed by the CPU of the terminal device, the processor of the management server, and the processor of the printer, in the case where in the third embodiment, the terminal device determines whether the threshold condition is satisfied based on the number of printable sheets transmitted from the printer and the threshold held by the terminal device, and transmits a request for auto-recharge from the terminal device to the management server when the threshold condition is satisfied;

FIG. 13 is a diagram showing an example of automatic setting of the threshold;

FIG. 14 is a flowchart showing an example of a control procedure relating to the automatic setting of the threshold executed by the processor of the management server;

FIGS. 15A and 15B are diagrams showing an example of a screen displayed on the touchscreen when setting the number of times of automatic purchases in the terminal device; and FIG. 16 is a sequence chart showing an example of a control procedure related to limiting the number of times of the automatic purchase, which is executed by the processor of the management server and the processor of the printer.

Embodiments of the present disclosure will be described with reference to the drawings.

First Embodiment

First, the first embodiment of the present disclosure will be described with reference to FIGS. 1 to 8. The first embodiment is an embodiment in which a management server holds a threshold that triggers auto-recharge.

Outline of Printing Service Providing System

Figure 1:
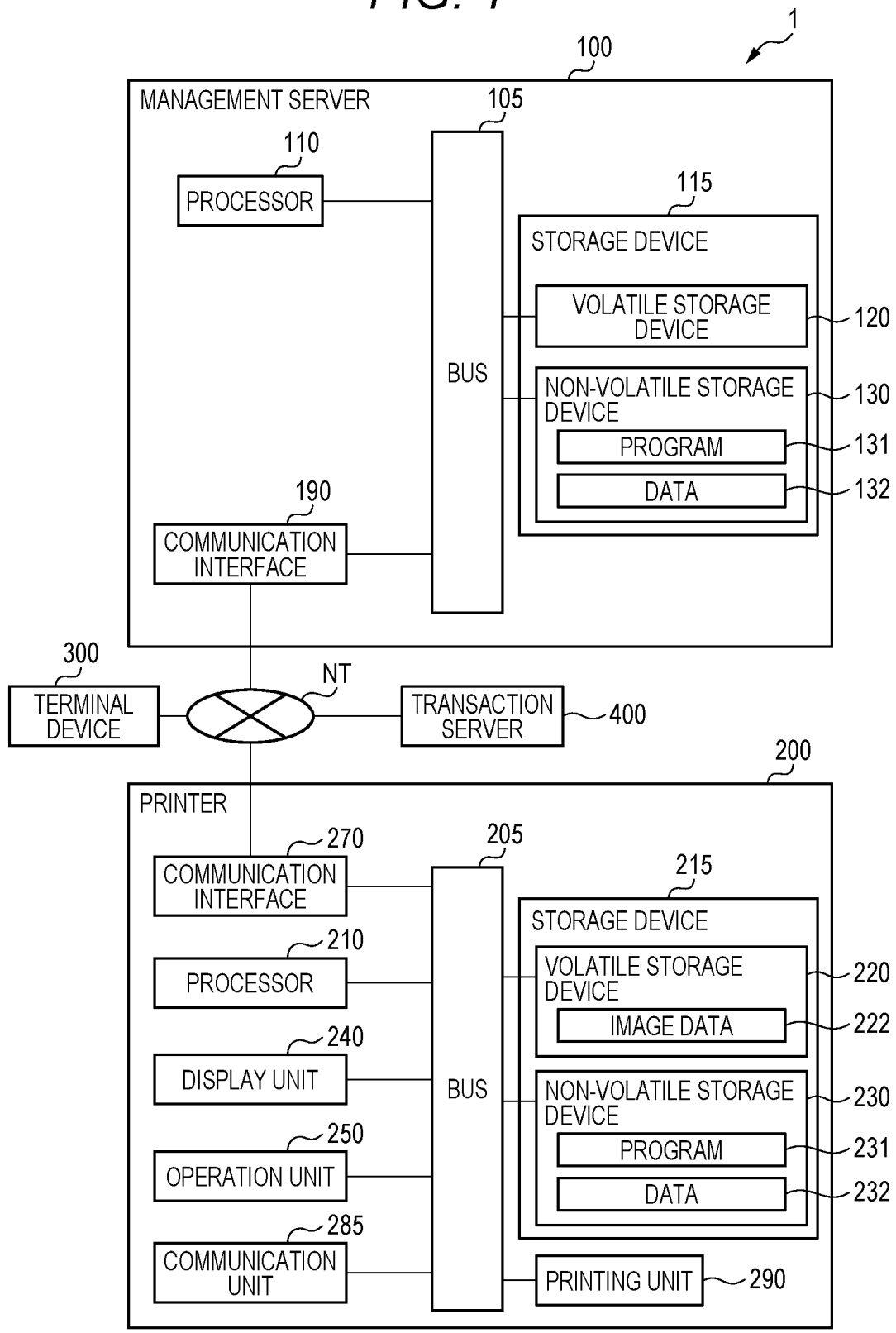
FIG. 1 is a block diagram showing an example of a system configuration of a printing service providing system according to a first embodiment.

FIG. 1 shows an example of a system configuration of a printing service providing system 1 according to the first embodiment. The printing service providing system 1 provides a prepaid printing service in which a user who is a customer pays fee in advance to use a printing function of a printer 200. In FIG. 1, the printing service providing system 1 includes a management server 100, the printer 200, a terminal device 300, and a transaction server 400. The management server 100, the printer 200, the terminal device 300, and the transaction server 400 are connected to a network NT including a mobile phone communication line and capable of communicating with each other. The printing service providing system 1 serves as an example of a printing authority management system, and the management server 100 serves as an example of an information management device, and the printer 200 serves as an example of a printing apparatus.

Management Server

The management server 100 is, for example, a server installed and managed by a manufacturer of the printer 200. As shown in FIG. 1, the management server 100 includes a processor 110, a storage device 115, and a communication interface 190. The processor 110, storage device 115, and communication interface 190 are connected to each other via a bus 105 so as to be able to transmit and receive data.

The storage device 115 includes a volatile storage device 120 and a non-volatile storage device 130. The volatile storage device 120 is, for example, a DRAM, and stores various programs and data to be processed. The non-volatile storage device 130 is, for example, a hard disk drive or solid state drive, and includes a program storage area 131 and a data storage area 132.

Various programs are stored in the program storage area 131. The various programs include a printing authority management program related to automatic purchase of a printing authority based on flowcharts in FIGS. 7 and 8, which will be described later. The data storage area 132 stores, for example, auto-recharge setting information including a threshold that triggers auto-recharge, and the number of sheets to be recharged. The non-volatile storage device 130 is an example of a storage.

The processor 110 is a device that performs data processing, such as a CPU, and executes various programs including the printing authority management program of the present embodiment stored in the program storage area 131. The processor 110 performs various kinds of processing including data communication with the terminal device 300, printer 200, and transaction server 400 connected to the network NT. The processor 110 executes purchase of the printing authority by the printing service providing system 1 of the present embodiment. The processor 110 and the programs stored in the program storage area 131 constitute an example of a controller. The processor 110 serves as an example of a second processor.

The communication interface 190 is a wired LAN interface or wireless interface for communicating with other devices, and is connected to the network NT. The communication interface 190 is an example of a communication interface (communication I/F).

The storage device 115 is not limited to the configuration of the device elements described above, and may be implemented by, for example, a RAM, ROM, EEPROM, HDD, portable recording medium such as USB memory attachable to and detachable from the management server 100, buffer or the like provided in the processor 110, or a combination thereof.

The storage device 115 may be a computer-readable storage medium. A computer-readable storage medium is a non-transitory medium. In addition to the above examples, the non-transitory medium includes recording media such as CD-ROM and DVD-ROM. The non-transitory medium may also be a tangible medium. The same applies to a storage device 215 of the printer 200, which will be described later.

Printer

The printer 200 is held by, for example, a user who receives the prepaid printing service. As shown in FIG. 1, the printer 200 includes a printing unit 290, a processor 210, the storage device 215, a display unit 240, an operation unit 250, a communication unit 285, and a communication interface 270. The printing unit 290, processor 210, storage device 215, display unit 240, operation unit 250, communication unit 285, and communication interface 270 are connected to each other via a bus 205 so as to be able to transmit and receive data.

The storage device 215 includes a volatile storage device 220 and a non-volatile storage device 230. The volatile storage device 220 is, for example, a DRAM, and includes an image data storage area 222 for storing image data to be printed. The non-volatile storage device 230 is, for example, a flash memory, and includes a program storage area 231 and a data storage area 232. Various programs are stored in the program storage area 231 as firmware for example. The data storage area 232 stores the number of printable sheets, a printer ID for identifying the printer 200, and the like.

The processor 210 is a device that performs data processing, such as a CPU. The processor 210 executes various programs stored in the program storage area 231. The processor 210 and the programs stored in the program storage area 231 constitute an example of the controller. The processor 210 serves as an example of a first processor.

The display unit 240 is, for example, a liquid crystal display, and can display various kinds of information. The operation unit 250 is a device that receives an operation by the user. The user can input various instructions to the printer 200 by operating the operation unit 250. The communication interface 270 is a wired or wireless network interface for communicating with other devices, and is connected to the network NT.

The printing unit 290 prints an image on a fed paper by a predetermined method while taking out and feeding the paper in a paper feed tray by a feeding mechanism (not shown). Although the printing method is not particularly limited, printing is performed by an inkjet method, for example. The printing unit 290 forms an image on the paper using ink in an ink cartridge that is detachably attached to a cartridge holder (not shown), according to a printing job transmitted from the terminal device 300 or a printing job generated by the printing unit 290 itself based on an operation on the operation unit 250.

The communication unit 285 is, for example, a terminal, and is electrically connected to a cartridge memory of the ink cartridge attached to the cartridge holder.

Terminal Device

Figure 2:
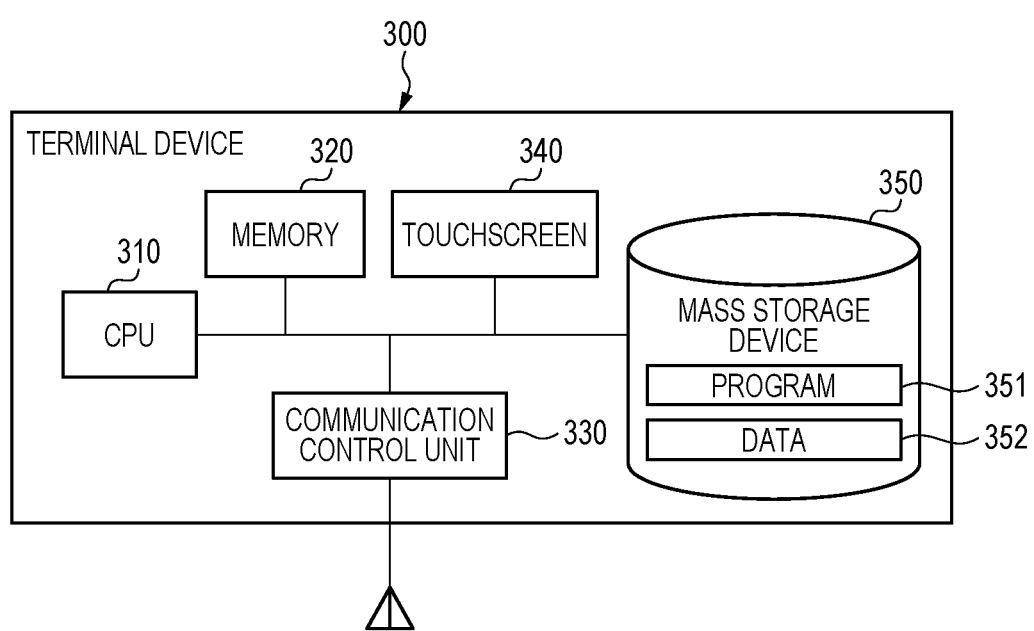
FIG. 2 is a block diagram showing an example of a system configuration of a terminal device.

FIG. 2 shows an example of a system configuration of the terminal device 300. The terminal device 300 is, for example, a mobile terminal such as a smartphone owned by the user, and is connected to the network NT via wireless communication. As shown in FIG. 2, the terminal device 300 includes a CPU 310, a memory 320, a communication control unit 330 for connecting to the network NT via wireless communication, a touchscreen 340, and a mass storage device 350.

The mass storage device 350 is, for example, a flash memory, and includes a program storage area 351 and a data storage area 352. Various programs are stored in the program storage area 351 as firmware for example. The CPU 310 executes the various programs stored in the program storage area 351. The CPU 310 executes various kinds of processing including data communication with the management server 100 connected to the network NT. The data storage area 352 stores a user ID or the like for identifying a user corresponding to the terminal device 300 issued based on the program or the printing service. The CPU 310 serves as an example of a processor or a third processor.

The terminal device 300 also displays various kinds of information on a touchscreen 340, which is an integral combination of a liquid crystal display and a touch pad, and receives various user operations. The user can input various instructions to the terminal device 300 by operating the touchscreen 340.

As the terminal device 300, other information terminals such as a tablet computer or a desktop PC may be used instead of the portable terminal.

Transaction Server

As shown in FIG. 1, the transaction server 400 is a server for online settlement via a network NW. The transaction server 400 includes a processor, a storage device, and a communication interface for connecting to the network NT (all not shown).

Prepaid Printing Service

Figure 3:
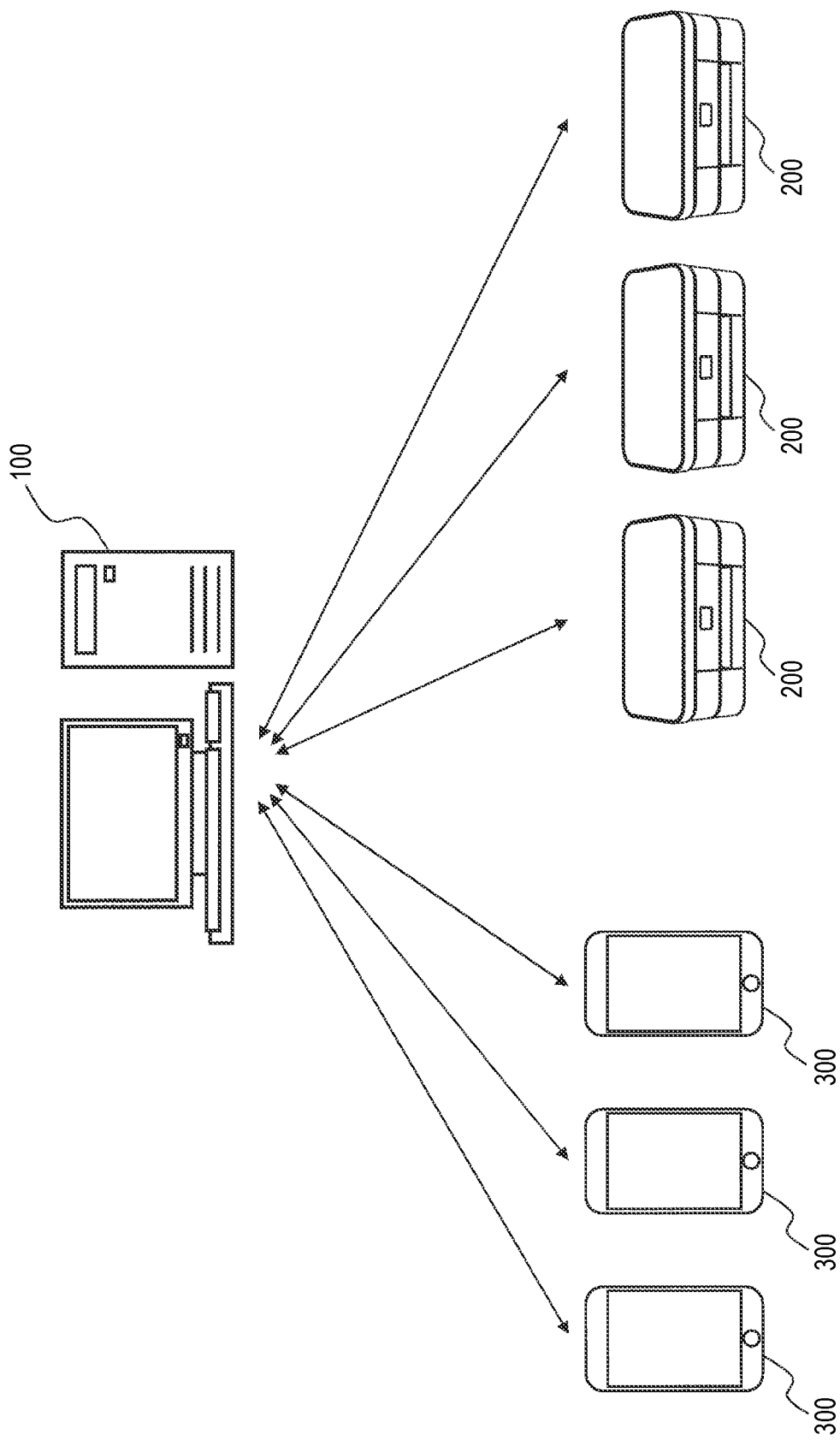
FIG. 3 is a diagram showing an example of an information transmission and reception form in the printing service providing system.

In the printing service providing system 1 of the present embodiment, the management server 100, printer 200, terminal device 300, and transaction server 400 are connected to each other via the network NT so as to be able to transmit and receive data. As a form of transmitting and receiving information, as shown in FIG. 3, a plurality of terminal devices 300 respectively owned by a plurality of users and a plurality of printers 200 installed in various places individually transmit and receive information to and from the management server 100. The management server 100 centrally manages events that are performed on the plurality of printers 200 from the plurality of terminal devices 300. The events include purchase or acquisition of a printing authority, execution of printing of the designated printer 200, and the like. The management server 100 executes these events in response to instructions from the terminal devices 300 or automatically when a predetermined condition is satisfied.

The printing service provided by the printing service providing system 1 in the present embodiment is a prepaid printing service. In the prepaid printing service, the number of sheets to be recharged which is guaranteed by the printing authority purchased in advance by the user is added to the number of printable sheets that can be printed by the printer 200, and printing processing can be executed in the printer 200 up to the number of printable sheets. The addition of the number of sheets to be recharged to the number of printable sheets is executed by the processor 110 of the management server 100, and for example, is transmitted to the printer 200 at regular timings. The number of printable sheets is stored, for example, in the data storage area 232 of the non-volatile storage device 230 of the printer 200, and is reduced by the number of printed sheets each time printing is executed. The reduction in the number of printable sheets is executed by the processor 210 of the printer 200, and for example, is transmitted to the management server 100 at regular timings. The number of sheets to be recharged is an example of a guaranteed printing amount, and the number of printable sheets is an example of an allowable printing amount.

In the printing service providing system 1 of the present embodiment, as a form of purchasing the printing authority, first, the purchasing of the printing authority based on a purchase request from the user can be executed. Purchasing of the printing authority based on the purchase request from the user is executed by transmitting a purchase application of the printing authority from the terminal device 300 to the management server 100 according to an operation from the user, and the management server 100 receiving the purchase application. The purchase of the printing authority is executed at any timing desired by the user. In this case, the user selects one recharge plan and purchases the corresponding printing authority, among a plurality of recharge plans with different prices and purchase units such as 50 sheets to be recharged=500 yen, 100 sheets to be recharged=900 yen, and 250 sheets to be recharged=2,000 yen (see FIGS. 4A to 4E and FIGS. 5A to 5F).

In this example, the printing authority corresponding to the recharge plan purchased by the user is acquired in association with the printer ID of the printer 200 designated by the user, and the number of sheets to be recharged which is guaranteed by the printing authority is added to the number of printable sheets for the printer 200. However, the present disclosure is not limited thereto, and the printing authority may be acquired in association with the user ID of the user, and the number of sheets to be recharged may be added to the number of printable sheets for the user ID.

The purchase of the printing authority based on the purchase request from the user is hereinafter referred to as "manual recharge" as appropriate.

Features of Embodiment

For example, after the user purchases a new printing authority by manual recharge as described above, purchasing additional printing authority by manual recharge each time the number of printable sheets of the corresponding printer 200 decreases will be troublesome and increase burden on the user.

Therefore, in the printing service providing system 1 of the present embodiment, automatic purchase of the printing authority not based on the purchase request from the user can be executed as another form of purchase of the printing authority other than the manual recharge. The automatic purchase of the printing authority not based on the purchase request from the user is hereinafter appropriately referred to as "auto-recharge".

When the management server 100 determines that a predetermined threshold condition is satisfied after the user newly purchases the printing authority by manual recharge, the management server 100 executes auto-recharge. In other words, a timing at which auto-recharge is executed is a timing at which a predetermined threshold condition is satisfied. In the present embodiment, as an example of the predetermined threshold condition, auto-recharge is executed when the number of printable sheets of the target printer 200 becomes equal to or less than a threshold. The threshold can be freely set by the user.

Specific Example of Threshold Setting in Terminal Device

FIGS. 4A to 4E show an example of a screen displayed on the touchscreen 340 of the terminal device 300 when setting the threshold in the terminal device 300. In FIGS. 4A to 4E show an example in which the number of sheets to be purchased by auto-recharge is designated.

First, when the user activates a dedicated application related to the printing authority management program in the terminal device 300, a home screen 340A shown in FIG. 4A is displayed. On this home screen 340A, the number of printable sheets of the printer 200 whose printer ID is "Printer01" and which can be used by the user is displayed together with, for example, a pie chart. The home screen 340A also displays a "recharge" button for instructing the printer 200 to execute manual recharge.

When the user operates a "recharge" button on the home screen 340A, the screen proceeds to a recharge plan screen 340B shown in FIG. 4B. On the recharge plan screen 340B, for example, buttons indicating "50 sheets/500 yen", "100 sheets/900 yen", "250 sheets/2,000 yen", "500 sheets/3,500 yen", "1,000 sheets/6,000 yen", and "1,500 sheets/7,500 yen" are displayed as plans of manual recharge. The manual recharge can be executed by the user selecting one among these six recharge plans.

On the recharge plan screen 340B, for example, a button indicating "250 sheets automatically/2000 yen" is displayed as a plan of auto-recharge. By selecting this button, the user can set auto-recharge, in which 250 sheets to be recharged are automatically purchased.

In this example, one recharge plan for auto-recharge is set in advance. Specifically, the number of sheets to be automatically purchased is specified as "250 sheets=2,000 yen". The number of sheets to be purchased may be changed to any number by the user through an operation by the terminal device 300 or the like. Alternatively, it may be set so that, for example, the recharge plan with the smallest number of sheets to be recharged among the recharge plans for the manual recharge that can be selected by the user, in the above example, "50 sheets=500 yen", is automatically purchased.

When the user operates the "250 sheets automatically/2,000 yen" button on the recharge plan screen 340B, the screen proceeds to an auto-recharge setting screen 340C shown in FIG. 4C. On the auto-recharge setting screen 340C, a threshold that triggers execution of auto-recharge is set. Specifically, the number of remaining printable sheets of the printer 200 at which auto-recharge is to be executed, that is, a threshold of the number of printable sheets, is set. In the example shown in FIG. 4C, the threshold of the number of printable sheets is set to 100, for example. The number of sheets to be purchased selected on the recharge plan screen 340B and the threshold of the number of printable sheets set on the auto-recharge setting screen 340C are received as auto-recharge setting information.

On the auto-recharge setting screen 340C, when the user inputs the number of printable sheets and then operates an "OK" button, the screen proceeds to a card information input screen 340D shown in FIG. 4D. On the card information input screen 340D, credit card information, such as a card number and expiration date, for executing online settlement is input.

On the card information input screen 340D, when the user inputs the credit card information and then operates an "OK" button, the screen proceeds to a home screen 340E shown in FIG. 4E. The home screen 340E indicates, in addition to the number of printable sheets of the printer 200 and the "recharge" button described above, that the auto-recharge is being set, the threshold, and the number of sheets to be purchased. In this example, the home screen 340E indicates that 250 sheets are automatically purchased when the number of remaining printable sheets reaches 100 sheets.

FIGS. 5A to 5F show another example of a screen displayed on the touchscreen 340 of the terminal device 300 when setting the threshold in the terminal device 300. In FIGS. 5A to 5F show an example in which an upper limit number of sheets for the auto-recharge is designated so that the number of printable sheets added with the number of sheets to be recharged which is automatically purchased reaches the predetermined upper limit number of sheets. The description of the same parts as those in FIGS. 4A to 4E will be omitted.

The home screen 340A shown in FIG. 5A is the same as that in FIG. 4A. When the user operates the "recharge" button on the home screen 340A, the screen proceeds to the recharge plan screen 340B shown in FIG. 5B. On the recharge plan screen 340B, as well as the plan for manual recharge described above, for example, a button indicating "automatic (upper limit number of sheets designated)" is shown as a plan for auto-recharge. By selecting this button, the user can set auto-recharge with a designated upper limit of the number of printable sheets after recharging.

When the user operates the "automatic (upper limit number of sheets designated)" button on the recharge plan screen 340B, the screen proceeds to the auto-recharge setting screen 340C shown in FIG. 5C. The auto-recharge setting screen 340C is the same as that in FIG. 4C.

On the auto-recharge setting screen 340C, when the user inputs the number of printable sheets and then operates the "OK" button, the screen proceeds to an auto-recharge setting screen 340F shown in FIG. 5F. On the auto-recharge setting screen 340F, how much the number of remaining printable sheets of the printer 200 reaches by the execution of the auto-recharge, that is, the upper limit number of sheets by auto-recharge, is set. In the example shown in FIG. 5F, the upper limit number of printable sheets as a result of execution of the auto-recharge is set to 500 for example.

On the auto-recharge setting screen 340F, when the user inputs the upper limit number of sheets and then operates an "OK" button, the screen proceeds to the card information input screen 340D shown in FIG. 5D. The card information input screen 340D is the same as that shown in FIG. 4D. The threshold of the number of printable sheets set on the auto-recharge setting screen 340C and the upper limit number of sheets for auto-recharge set on the auto-recharge setting screen 340F are received as the auto-recharge setting information.

On the card information input screen 340D, when the user inputs the credit card information and then operates the "OK" button, the screen proceeds to the home screen 340E shown in FIG. 5E. The home screen 340E indicates, in addition to the number of printable sheets of the printer 200 and the "recharge" button described above, that the auto-recharge is being set, the threshold, and the upper limit number of sheets. In this example, the home screen 340E indicates that when the number of remaining printable sheets reaches 100, the number of sheets to be recharged is automatically purchased such that the number of printable sheets becomes 500.

The user may be able to select which auto-recharge plan to use between the case where the number of sheets to be purchased for auto-recharge is designated as shown in FIGS. 4A to 4E and the case where the upper limit number of sheets for auto-recharge is designated as shown in FIGS. 5A to 5F.

Figure 6A:
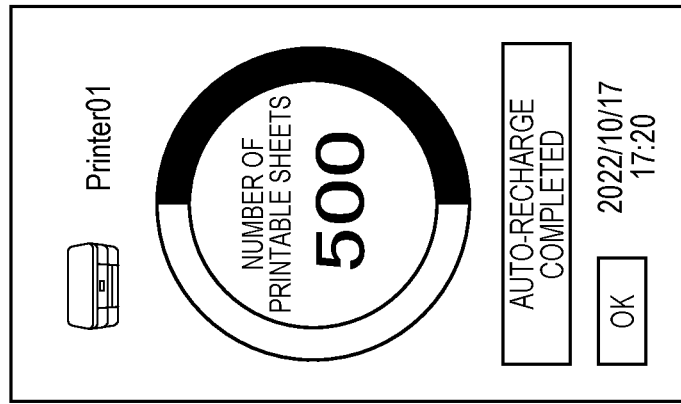
FIGS. 6A and 6B are diagrams showing examples of an auto-recharge completion screen displayed on the touchscreen of the terminal device when auto-recharge is executed by a management server.
Figure 6B:
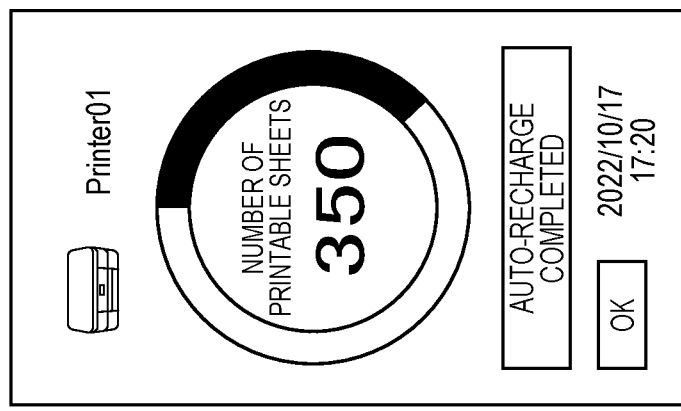

FIGS. 6A and 6B show examples of an auto-recharge completion screen displayed on the touchscreen 340 of the terminal device 300 when auto-recharge is executed by the management server 100.

FIG. 6A is an example of an auto-recharge completion screen 340I in the case where the number of sheets to be purchased for auto-recharge is designated as shown in FIGS. 4A to 4E. As shown in FIG. 6A, the auto-recharge completion screen 340I indicates that the auto-recharge is completed, and indicates the number of printable sheets becomes 350 as a result in the number of remaining printable sheets reaching 100 and then 250 sheets to be recharged being automatically purchased. On the auto-recharge completion screen 340I, when the user operates an "OK" button, the screen proceeds to, for example, the home screen 340A shown in FIG. 4A.

FIG. 6B is an example of an auto-recharge completion screen 340J in the case where the upper limit number of sheets for auto-recharge is designated as shown in FIGS. 5A to 5F. As shown in FIG. 6B, the auto-recharge completion screen 340J indicates that the auto-recharge is completed, and indicates that the number of printable sheets becomes 500 as a result of the number of remaining printable sheets reaching 100 and then the number of charged sheets being automatically purchased such that the number of printable sheets becomes the upper limit number of sheets, which is 500. On the auto-recharge completion screen 340J, when the user operates an "OK" button, the screen proceeds, for example, the home screen 340A shown in FIG. 5A.

Control Procedure

An example of a control procedure executed by the processor 110 of the management server 100, the processor 210 of the printer 200, and the CPU 310 of the terminal device 300 in order to implement the above method in the present embodiment will be described with reference to sequence charts in FIGS. 7 and 8.

FIG. 7 shows an example of a control procedure when the threshold is set by the terminal device 300 and stored in the management server 100. As shown in FIG. 7, in step S10, the CPU 310 of the terminal device 300 displays the auto-recharge setting screen on the touchscreen 340. Specifically, as shown in FIGS. 4A to 4E described above, when designating the number of sheets to be purchased and setting the auto-recharge, the CPU 310 of the terminal device 300 displays the auto-recharge setting screen 340C on the touchscreen 340. As shown in FIGS. 5A to 5F described above, when designating the upper limit number of sheets and setting the auto-recharge, the CPU 310 of the terminal device 300 displays the auto-recharge setting screens 340C and 340F on the touchscreen 340.

In step S20, the CPU 310 of the terminal device 300 receives input of the auto-recharge setting information including the threshold set by the user on the auto-recharge setting screen displayed in the step S10. Specifically, as shown in FIGS. 4A to 4E described above, when designating the number of sheets to be purchased and setting the auto-recharge, the CPU 310 of the terminal device 300 receives input of the number of printable sheets as a threshold on the auto-recharge setting screen 340C. As shown in FIGS. 5A to 5F described above, when designating the upper limit number of sheets and setting the auto-recharge, the CPU 310 of the terminal device 300 receives, in addition to the number of printable sheets as a threshold, input of the number of printable sheets as an upper limit on the auto-recharge setting screen 340F. The CPU 310 of the terminal device 300 that executes the step S20 is an example of a threshold receiving unit.

In step S30, the CPU 310 of the terminal device 300 transmits the auto-recharge setting information including the threshold received in the step S20 and the like to the management server 100 together with the corresponding printer ID or user ID.

In step S40, the processor 110 of the management server 100 stores the auto-recharge setting information received from the terminal device 300 in the data storage area 132 of the non-volatile storage device 130 in association with the printer ID or user ID. After the above, the CPU 310 of the terminal device 300 and the processor 110 of the management server 100 end this flow.

FIG. 8 shows an example of a control procedure in a case where the management server 100 determines whether the threshold condition is satisfied based on the number of printable sheets transmitted from the printer 200 and the threshold held by the management server 100, and executes auto-recharge when the threshold condition is satisfied.

As shown in FIG. 8, in step S105, the processor 210 of the printer 200 determines whether it is a transmission timing now to transmit a predetermined number of printable sheets. The processor 210 repeats the step S105 until the transmission timing (step S105: No), and when the transmission timing comes (step S105: Yes), proceeds to a next step S110.

In the step S110, the processor 210 of the printer 200 transmits to the management server 100, together with the printer ID, the latest number of printable sheets at the transmission timing. The processor 210 of the printer 200 that executes the step S110 is an example of a first allowable printing amount transmission unit.

In step S115, the processor 110 of the management server 100 acquires the number of printable sheets and the printer ID transmitted from the printer 200.

In step S120, the processor 110 of the management server 100 reads the auto-recharge setting information corresponding to the printer ID acquired in the step S115 from the data storage area 132 of the non-volatile storage device 130.

In step S125, the processor 110 of the management server 100 determines whether the number of printable sheets becomes equal to or less than the threshold based on the number of printable sheets acquired in the above step S115, and the threshold included in the auto-recharge setting information read in the above step S120. If the number of printable sheets is greater than the threshold (step S125: No), the processor 110 returns to the step S115. On the other hand, if the number of printable sheets is equal to or less than the threshold (step S125: Yes), the processor 110 proceeds to a next step S130. The processor 110 of the management server 100 that executes the step S125 is an example of a second determination unit.

In the step S130, the processor 110 of the management server 100 automatically purchases the number of sheets to be recharged as the printing authority based on the number of sheets to be purchased or the upper limit number of sheets included in the auto-recharge setting information read in the step S120. Specifically, the processor 110 automatically purchases the number of sheets to be recharged by the number of sheets to be purchased when the number of sheets to be purchased is included in the auto-recharge setting information, and by the number of sheets until reaching the upper limit number of sheets when the upper limit number of sheets is included in the auto-recharge setting information. The processor 110 of the management server 100 that executes the step S130 is an example of an automatic purchasing unit.

In step S135, the processor 110 of the management server 100 adds the number of sheets to be recharged which is automatically purchased in the step S130 to the number of printable sheets of the printer 200 corresponding to the printer ID acquired in the step S115. In other words, the processor 110 grants the printing authority automatically purchased in the step S130 to the printer 200 corresponding to the printer ID acquired in the step S115. The processor 110 of the management server 100 that executes the step S135 is an example of an allowable printing amount adding unit and a printing authority granting unit.

In step S140, the processor 110 of the management server 100 executes settlement according to the number of sheets to be recharged which is automatically purchased in the step S130. The settlement is executed by, for example, transmitting a settlement execution command to the transaction server 400.

In step S145, the processor 110 of the management server 100 transmits to the printer 200 the number of printable sheets updated by adding the number of sheets to be recharged in the step S135.

In step S150, the processor 210 of the printer 200 updates the number of printable sheets stored in the data storage area 232 of the non-volatile storage device 230 based on the number of printable sheets received from the management server 100.

In step S155, the processor 210 of the printer 200 transmits to the terminal device 300 the number of printable sheets updated in the step S150 and a completion notification indicating that the auto-recharge is completed.

In step S160, the CPU 310 of terminal device 300 acquires from the printer 200 the number of printable sheets updated by executing the auto-recharge and the completion notification of the auto-recharge.

In step S165, the CPU 310 of the terminal device 300 displays the auto-recharge completion screen on the touchscreen 340 based on the number of printable sheets and the auto-recharge completion notification acquired in the step S160. Specifically, when the number of sheets to be purchased is specified and the auto-recharge is set as shown in FIGS. 4A to 4E, the CPU 310 of the terminal device 300 displays the auto-recharge completion screen 340I on the touchscreen 340 as shown in FIG. 6A. When the upper limit number of sheets is specified and the auto-recharge is set as shown in FIGS. 5A to 5F, the CPU 310 of the terminal device 300 displays the auto-recharge completion screen 340I on the touchscreen 340 as shown in FIG. 6B. After the above, the processor 110 of the management server 100, the processor 210 of the printer 200, and the CPU 310 of the terminal device 300 end this flow.

In the above description, the number of printable sheets updated by executing auto-recharge and the completion notification of auto-recharge are transmitted from the printer 200 to the terminal device 300, but the present disclosure is not limited thereto, and they may be transmitted from the management server 100 to the terminal device 300.

Effects of First Embodiment

The printing service providing system 1 according to the first embodiment described above includes the terminal device 300, the management server 100, and the printer 200, and manages the printing authority of the printer 200. The user can execute printing by a so-called prepaid system, in which the user acquires the printing authority with an expense. The printer 200 is able to print up to the number of printable sheets. The processor 110 of the management server 100 can increase the number of printable sheets in accordance with the predetermined number of sheets to be recharged guaranteed by the printing authority acquired by the user.

The printing service providing system 1 includes the processor 110 that executes the steps S130 and S135, and the non-volatile storage device 130. When printing is executed sequentially, the number of printable sheets, which is an upper limit of the number of sheets that can be printed by the printer 200, decreases. When the predetermined threshold condition stored in advance in the non-volatile storage device 130 is satisfied as the number of printable sheets decreases, automatic purchase of the number of sheets to be recharged is performed in the step S130, and the number of sheets to be recharged is automatically purchased. The number of sheets to be recharged which is automatically purchased is granted to the corresponding user or printer 200 in the step S135. By adding the number of sheets to be recharged corresponding to the automatically purchased printing authority to the number of printable sheets, the upper limit of a printable amount of the printer 200 can be increased thereafter.

According to the present embodiment, since the number of sheets to be recharged is automatically purchased in a prepaid way based on the satisfaction of the predetermined threshold condition, for example, the user does not need to manually purchase additional number of sheets to be recharged, thereby reducing the time and effort and improving convenience.

In the present embodiment, particularly, the printing service providing system 1 further includes the CPU 310 of the terminal device 300 that executes the step S20 of receiving the threshold set by the user, and the non-volatile storage device 130 of the management server 100 stores the received threshold. According to the present embodiment, the user can freely set the number of printable sheets at which the automatic purchase is to be executed, thereby further improving convenience.

In the present embodiment, particularly, when the printer 200 sequentially executes printing, the number of printable sheets that can be printed by the printer 200 decreases, and when the number of printable sheets falls below the threshold, the number of sheets to be recharged is automatically purchased. According to the present embodiment, the user can continue printing as desired without being aware of the decrease in the number of printable sheets.

In the present embodiment particularly, the processor 110 of the management server 100 performs automatic purchase in the step S130 so that the number of printable sheets after being added with the number of sheets to be recharged corresponding to the automatically purchased printing authority becomes a predetermined value. According to the present embodiment, every time the number of sheets to be recharged is automatically purchased, the number of printable sheets after being added in the step S135 is always constant, and therefore, it is possible to provide the user with a sense of security that a certain printing amount can be reliably performed at all times.

In the present embodiment, particularly, the management server 100 stores the threshold in the non-volatile storage device 130, and using the threshold, the processor 110 determines in the step S125 whether the number of printable sheets becomes equal to or less than the threshold. According to the determination result, the processor 110 of the management server 100 performs automatic purchase in the step S130. According to the present embodiment, automatic purchase can be executed in a manner led by the management server 100 communicably connected to the printer 200.

In the present embodiment, particularly, in the steps S105 and S110, the printer 200 that actually executes printing and reduces the number of printable sheets transmits the latest number of printable sheets to the management server 100 at predetermined intervals. Accordingly, the processor 110 of the management server 100 determines whether to perform automatic purchase in the step S125. According to the present embodiment, automatic purchase can be smoothly executed in a manner led by the management server 100.

Second Embodiment

Next, the second embodiment of the present disclosure will be described with reference to FIGS. 9 and 10. The second embodiment is an embodiment in which the printer 200 holds the threshold that triggers the auto-recharge.

The system configuration of the printing service providing system 1 according to the second embodiment is the same as that in the first embodiment described above, and therefore, description thereof will be omitted. In the second embodiment, the auto-recharge setting information including the threshold that triggers the auto-recharge is stored in the data storage area 232 of the non-volatile storage device 230 of the printer 200. The non-volatile storage device 230 is an example of the storage.

Control Procedure

An example of a control procedure executed by the processor 110 of the management server 100, the processor 210 of the printer 200, and the CPU 310 of the terminal device 300 in the present embodiment will be described with reference to sequence charts in FIGS. 9 and 10.

FIG. 9 shows an example of a control procedure when the threshold is set by the terminal device 300 and stored in the printer 200. As shown in FIG. 9, in step S210, the CPU 310 of the terminal device 300 displays the auto-recharge setting screen on the touchscreen 340 as in the above step S10.

In step S220, the CPU 310 of the terminal device 300 receives the input of the auto-recharge setting information including the threshold set by the user on the auto-recharge setting screen displayed in the step S210, as in the above step S20. The CPU 310 of the terminal device 300 that executes the step S220 is an example of the threshold receiving unit.

In step S230, the CPU 310 of the terminal device 300 transmits the auto-recharge setting information including the threshold received in the step S220 to the printer 200.

In step S240, the processor 210 of the printer 200 stores the auto-recharge setting information received from the terminal device 300 in the data storage area 232 of the non-volatile storage device 230. After the above, the CPU 310 of the terminal device 300 and the processor 210 of the printer 200 end this flow.

FIG. 10 shows an example of a control procedure in a case where the printer 200 determines whether the threshold condition is satisfied based on the number of printable sheets and the threshold held by the printer 200, and transmits the auto-recharge request to the management server 100 when the threshold condition is satisfied.

In step S305, the processor 210 of the printer 200 reads the latest number of printable sheets from the data storage area 232 of the non-volatile storage device 230.

In step S310, the processor 210 of the printer 200 reads the auto-recharge setting information stored in the step S240 from the data storage area 232 of the non-volatile storage device 230.

In step S315, the processor 210 of the printer 200 determines whether the number of printable sheets becomes equal to or less than the threshold based on the number of printable sheets read out in the above step S305, and the threshold included in the auto-recharge setting information read out in the above step S310. If the number of printable sheets is greater than the threshold (step S315: No), the processor 210 returns to the step S305. On the other hand, if the number of printable sheets is equal to or less than the threshold (step S315: Yes), the processor 210 proceeds to a next step S320. The processor 210 of the printer 200 that executes the step S315 is an example of a first determination unit, and the step S315 is an example of determination processing.

In step S320, the processor 210 of the printer 200 transmits to the management server 100 a purchase request requesting automatic purchase of the number of sheets to be recharged. Specifically, the processor 210 transmits a purchase request that requests automatic purchase of the number of sheets to be recharged by the number of sheets to be purchased when the number of sheets to be purchased is included in the auto-recharge setting information, and by the number of sheets until reaching the upper limit number of sheets when the upper limit number of sheets is included in the auto-recharge setting information. The purchase request is an example of a first request notification, and the processor 210 of the printer 200 that executes the step S320 is an example of the first notification transmission unit. The above purchase request is an example of a third request notification, and the step S320 is an example of notification transmission processing.

In step S325, the processor 110 of the management server 100 determines whether the purchase request is received from the printer 200. If the purchase request is not received (step S325: No), the processor 110 ends this flow. On the other hand, if the purchase request is received (step S325: Yes), the processor 110 proceeds to a next step S330.

In step S330, the processor 110 of the management server 100 automatically purchases the number of sheets to be recharged as the printing authority based on the purchase request received from the printer 200. The processor 110 of the management server 100 that executes the step S330 is an example of the automatic purchasing unit.

In step S335, the processor 110 of the management server 100 adds the number of sheets to be recharged which is automatically purchased in the step S330 to the number of printable sheets of the printer 200 that transmits the purchase request in the step S320. In other words, the processor 110 grants the printing authority automatically purchased in the step S330 to the printer 200 that transmits the purchase request in the step S320. The processor 110 of the management server 100 that executes the step S335 is an example of the allowable printing amount adding unit and the printing authority granting unit.

In step S340, the processor 110 of the management server 100 executes settlement according to the number of sheets to be recharged which is automatically purchased in the step S330. The settlement is executed by, for example, transmitting a settlement execution command to the transaction server 400.

In step S345, the processor 110 of the management server 100 transmits to the printer 200 the number of printable sheets updated by adding the number of sheets to be recharged in the step S335.

In step S350, the processor 210 of the printer 200 updates the number of printable sheets stored in the data storage area 232 of the non-volatile storage device 230 based on the number of printable sheets received from the management server 100. That is, the processor 210 acquires the number of printable sheets added with the number of sheets to be recharged. The step S350 is an example of allowable printing amount acquisition processing.

In step S355, the processor 210 of the printer 200 transmits to the terminal device 300 the number of printable sheets updated in the step S350 and a completion notification indicating that the auto-recharge is completed.

In step S360, the CPU 310 of terminal device 300 acquires from the printer 200 the number of printable sheets updated by executing the auto-recharge and the completion notification of the auto-recharge.

In step S365, the CPU 310 of the terminal device 300 displays the auto-recharge completion screen on the touchscreen 340 based on the number of printable sheets and the auto-recharge completion notification acquired in the step S360. After the above, the processor 110 of the management server 100, the processor 210 of the printer 200, and the CPU 310 of the terminal device 300 end this flow.

In the above description, the number of printable sheets updated by executing auto-recharge and the completion notification of auto-recharge are transmitted from the printer 200 to the terminal device 300, but the present disclosure is not limited thereto, and they may be transmitted from the management server 100 to the terminal device 300.

Effects of Second Embodiment

In the second embodiment described above, the printer 200 stores the threshold in the non-volatile storage device 230, and using the threshold, the processor 210 of the printer 200 determines in the step S315 whether the number of printable sheets becomes equal to or less than the threshold. According to the determination result, the processor 110 of the management server 100 performs automatic purchase of the number of sheets to be recharged in the step S330. According to the present embodiment, the printer 200 itself, which actually executes printing to reduce the number of printable sheets, stores the threshold and determines whether to further perform automatic purchase, so that automatic purchase led by the printer 200 can be executed.

In the present embodiment, when the processor 210 of the printer 200 determines in the step S315 that the number of printable sheets becomes equal to or less than the threshold, a purchase request is transmitted to the management server 100 in the step S320 to request automatic purchase. Accordingly, the processor 110 of the management server 100 performs automatic purchase of the number of sheets to be recharged in the step S330. According to the present embodiment, the printer 200 that makes the determination requests the automatic purchase, so that automatic purchase led by the printer 200 can be smoothly executed.

Third Embodiment

Next, the third embodiment of the present disclosure will be described with reference to FIGS. 11 and 12. The third embodiment is an embodiment in which the terminal device 300 holds the threshold that triggers the auto-recharge.

The system configuration of the printing service providing system 1 according to the third embodiment is the same as those in the first embodiment and second embodiment described above, and therefore, description thereof will be omitted. In the third embodiment, the auto-recharge setting information including the threshold that triggers the auto-recharge is stored in the data storage area 352 of the mass storage device 350 of the terminal device 300. The mass storage device 350 is an example of a storage.

Control Procedure

An example of a control procedure executed by the processor 110 of the management server 100, the processor 210 of the printer 200, and the CPU 310 of the terminal device 300 in the present embodiment will be described with reference to a flowchart in FIG. 11 and a sequence chart in FIG. 12.

FIG. 11 shows an example of a control procedure when the threshold is set by and stored in the terminal device 300. As shown in FIG. 11, in step S410, the CPU 310 of the terminal device 300 displays the auto-recharge setting screen on the touchscreen 340 as in the above step S10.

In step S420, the CPU 310 of the terminal device 300 receives the input of the auto-recharge setting information including the threshold set by the user on the auto-recharge setting screen displayed in the step S410, as in the above step S20. The CPU 310 of the terminal device 300 that executes the step S420 is an example of the threshold receiving unit.

In the step S430, the CPU 310 of the terminal device 300 stores the auto-recharge setting information including the threshold received in the step S420 in the data storage area 352 of the mass storage device 350. After the above, the CPU 310 of the terminal device 300 ends this flow.

FIG. 12 shows an example of a control procedure in a case where the terminal device 300 determines whether the threshold condition is satisfied based on the number of printable sheets transmitted from the printer 200 and the threshold held by the terminal device 300, and a request for auto-recharge is transmitted from the terminal device 300 to the management server 100 when the threshold condition is satisfied.

As shown in FIG. 12, in step S505, the processor 210 of the printer 200 determines whether it is a transmission timing now to transmit a predetermined number of printable sheets. The processor 210 repeats the step S505 until the transmission timing (step S505: No), and when the transmission timing comes (step S505: Yes), proceeds to a next step S510.

In the step S510, the processor 210 of the printer 200 transmits to the terminal device 300, together with the printer ID, the latest number of printable sheets at the transmission timing. The processor 210 of the printer 200 that executes the step S510 is an example of a second allowable printing amount transmission unit.

In step S515, the CPU 310 of the terminal device 300 acquires the number of printable sheets and the printer ID transmitted from the printer 200. The step S515 is an allowable printing amount acquisition step.

In step S520, the CPU 310 of the terminal device 300 reads the auto-recharge setting information corresponding to the printer ID acquired in the step S515 from the data storage area 352 of the mass storage device 350.

In step S525, the CPU 310 of the terminal device 300 determines whether the number of printable sheets becomes equal to or less than the threshold based on the number of printable sheets acquired in the step S515, and the threshold included in the auto-recharge setting information read in the step S520. If the number of printable sheets is greater than the threshold (step S525: No), the CPU 310 returns to the step S515. On the other hand, if the number of printable sheets is equal to or less than the threshold (step S525: Yes), the CPU 310 proceeds to a next step S530. The CPU 310 of the terminal device 300 that executes the step S525 is an example of a third determination unit, and the step S525 is an example of a determination step.

In step S530, the CPU 310 of the terminal device 300 transmits to the management server 100 a purchase request requesting automatic purchase of the number of sheets to be recharged. Specifically, the CPU 310 transmits a purchase request that requests automatic purchase of the number of sheets to be recharged by the number of sheets to be purchased when the number of sheets to be purchased is included in the auto-recharge setting information, and by the number of sheets until reaching the upper limit number of sheets when the upper limit number of sheets is included in the auto-recharge setting information. The purchase request includes the printer ID acquired in the step S515. The purchase request is an example of a second request notification, and the CPU 310 of the terminal device 300 that executes the step S530 is an example of a second notification transmission unit. The above purchase request is an example of a fourth request notification, and the step S530 is an example of a notification transmission step.

In step S535, the processor 110 of the management server 100 determines whether the purchase request is received from the terminal device 300. If the purchase request is not received (step S535: No), the processor 110 ends this flow.

On the other hand, if the purchase request is received (step S535: Yes), the processor 110 proceeds to a next step S540.

In step S540, the processor 110 of the management server 100 automatically purchases the number of sheets to be recharged as the printing authority based on the purchase request received from the terminal device 300. The processor 110 of the management server 100 that executes the step S540 is an example of the automatic purchasing unit.

In step S545, the processor 110 of the management server 100 adds the number of sheets to be recharged which is automatically purchased in the step S540 to the number of printable sheets of the printer 200 corresponding to the printer ID included in the purchase request received from the terminal device 300. In other words, the processor 110 grants the printing authority automatically purchased in the step S540 to the printer 200 corresponding to the printer ID included in the purchase request. The processor 110 of the management server 100 that executes the step S545 is an example of the allowable printing amount adding unit and the printing authority granting unit.

In step S550, the processor 110 of the management server 100 executes settlement according to the number of sheets to be recharged which is automatically purchased in the step S540. The settlement is executed by, for example, transmitting a settlement execution command to the transaction server 400.

In step S555, the processor 110 of the management server 100 transmits to the printer 200 the number of printable sheets updated by adding the number of sheets to be recharged in the step S545.

In step S560, the processor 210 of the printer 200 updates the number of printable sheets stored in the data storage area 232 of the non-volatile storage device 230 based on the number of printable sheets received from the management server 100.

In step S565, the processor 210 of the printer 200 transmits to the terminal device 300 the number of printable sheets updated in the step S560 and a completion notification indicating that the auto-recharge is completed.

In step S570, the CPU 310 of terminal device 300 acquires from the printer 200 the number of printable sheets updated by executing the auto-recharge and the completion notification of the auto-recharge.

In step S575, the CPU 310 of the terminal device 300 displays the auto-recharge completion screen on the touch-screen 340 based on the number of printable sheets and the auto-recharge completion notification acquired in the step S570. After the above, the CPU 310 of the terminal device 300, the processor 110 of the management server 100, and the processor 210 of the printer 200 end this flow.

In the above description, the number of printable sheets updated by executing auto-recharge and the completion notification of auto-recharge are transmitted from the printer 200 to the terminal device 300, but the present disclosure is not limited thereto, and they may be transmitted from the management server 100 to the terminal device 300.

Effects of Third Embodiment

In the third embodiment described above, the terminal device 300 stores the threshold in the mass storage device 350, and using the threshold, the CPU 310 of the terminal device 300 determines in the step S525 whether the number of printable sheets becomes equal to or less than the threshold. According to the determination result, the processor 110 of the management server 100 performs automatic purchase of the number of sheets to be recharged in the step S540.

According to the present embodiment, automatic purchase can be executed in a manner led by the terminal device 300 communicably connected to the printer 200.

In the present embodiment, particularly, in the steps S505 and S510, the processor 210 of the printer 200 that actually executes printing and reduces the number of printable sheets transmits the latest number of printable sheets to the terminal device 300 at predetermined intervals. Accordingly, the CPU 310 of the terminal device 300 determines whether to perform automatic purchase in the step S525. According to the present embodiment, automatic purchase can be smoothly executed in a manner led by the terminal device 300.

In the present embodiment, particularly, when the CPU 310 of the terminal device 300 determines in the step S525 that the number of printable sheets becomes equal to or less than the threshold, a purchase request is transmitted to the management server 100 in the step S530 to request automatic purchase. Accordingly, the processor 110 of the management server 100 performs automatic purchase of the number of sheets to be recharged in the step S540. According to the present embodiment, the terminal device 300 that makes the determination requests the automatic purchase, so that automatic purchase led by the terminal device 300 can be smoothly executed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification (1) Case of Automatically Setting Threshold Based on Printing History of User In the above, the threshold is set manually by the user, but the threshold may be automatically set based on a printing history of the user. For example, the threshold may be automatically set based on a decrease behavior of the number of printable sheets in the printing history of the user.

FIG. 13 shows an example of the automatic setting of the threshold. In the example shown in FIG. 13, for example, if the number of printed sheets for the last three days by the user is 100 or less, the threshold for the number of printable sheets is set to 100 sheets, and if the number of printed sheets is 101 or more and 200 or less, the threshold is set to 200, and if the number of printed sheets is 201 or more and 300 or less, the threshold is set to 300. The printing history is not limited to the last three days, and for example, the threshold may be automatically updated every day as the number of printed sheets in the last one day. Alternatively, the threshold may be set based on a behavior over a relatively long span, such as the most recent week or the most recent month.

FIG. 14 shows an example of a control procedure relating to the automatic setting of the threshold executed by the processor 110 of the management server 100.

As shown in FIG. 14, in step S610, the processor 110 of the management server 100 acquires the printing history of the user from the printer 200.

In step S620, the processor 110 of the management server 100 automatically sets the threshold for the number of printable sheets for executing auto-recharge based on the printing history acquired in the step S610. The processor 110 of the management server 100 that executes the step S620 is an example of a threshold automatic setting unit.

In step S630, the processor 110 of the management server 100 stores the threshold set in the step S620 in the data storage area 132 of the non-volatile storage device 130. After the above, the processor 110 of the management server 100 ends this flow.

In the above description, the management server 100 acquires the printing history from the printer 200 and automatically sets the threshold, but the present disclosure is not limited thereto. For example, the printer 200 may automatically set the threshold based on the printing history held by itself, and transmit the set threshold to the management server 100. Alternatively, the terminal device 300 may acquire the printing history from the printer 200, automatically set the threshold, and transmit the set threshold to the management server 100.

According to the present modification, for example, the threshold for the number of printable sheets is set to be relatively large for a user who prints a relatively large amount each time, and the threshold for the number of printable sheets is set relatively small for a user who prints a relatively small amount each print, so that automatic purchase can be performed at an appropriate timing according to usage characteristics of the user.

(2) Case of Limiting Number of Times of Automatic Purchase

Although the number of times of automatic purchase is not particularly limited in the above description, the number of times of automatic purchase may be limited. In this case, the number of times of automatic purchase within a predetermined period may be limited, or a cumulative number of times of automatic purchase may be limited.

FIGS. 15A and 15B show an example of a screen displayed on the touchscreen 340 when setting an upper limit number of times of automatic purchase in the terminal device 300. For example, when the user presses a setting button 340A1 on the home screen 340A shown in FIG. 4A or FIG. 5A, a setting screen 340G shown in FIG. 15A is displayed. Various items that can be set by the user are displayed on the setting screen 340G.

When the user operates an "auto-recharge" button on the setting screen 340G, the screen proceeds to an auto-recharge setting screen 340H shown in FIG. 15B. For example, whether to set the upper limit number of times of recharge per month and a value of the upper limit number of times of recharge are set on the auto-recharge setting screen 340H. In the example shown in FIG. 15B, the upper limit number of times of recharge per month is set to five times, for example. In this case, one month is an example of the predetermined period.

FIG. 16 shows an example of a control procedure related to limiting the number of times of the automatic purchase, which is executed by the processor 110 of the management server 100 and the processor 210 of the printer 200. In FIG. 16, the same steps as those in FIG. 8 are given the same reference numerals, and description thereof is omitted.

In step S101, the processor 110 of the management server 100 determines whether it is a reset timing to reset a variable N for counting the number of times of automatic purchase. The reset timing is, for example, a beginning of a month or an end of a month when the number of times of automatic purchase per month is limited. If it is not the reset timing (step S101: No), the processor 110 directly proceeds to step S115. On the other hand, if the reset timing comes (step S101: Yes), the processor 110 proceeds to a next step S103.

In the step S103, the processor 110 of the management server 100 resets the variable N to 0.

Since the steps S105 to S125 are the same as those in FIG. 8 described above, description thereof will be omitted. In the step S125, if the number of printable sheets is equal to or less than the threshold (step S125: Yes), the processor 110 of the management server 100 proceeds to a next step S127.

In the step S127, the processor 110 of the management server 100 determines whether the variable N is greater than the upper limit number of times set on the auto-recharge setting screen 340H. If it is determined that the variable N is greater than the upper limit number of times (step S127: Yes), the processor 110 proceeds to a next step S128.

In the step S128, the processor 110 of the management server 100 causes the touchscreen 340 of the terminal device 300 or the display unit 240 of the printer 200 to display a message indicating that purchase cannot be made since the number of times of automatic purchase reaches the upper limit number of times. Then, the processor 110 of the management server 100 ends this flow without executing the automatic purchase of the number of sheets to be recharged.

On the other hand, if it is determined in the step S127 that the variable N is equal to or less than the upper limit number of times (step S127: No), the processor 110 of the management server 100 proceeds to a next step S130.

Since the steps S130 to S150 are the same as those in FIG. 8 described above, description thereof will be omitted.

In the step S155, the processor 110 of the management server 100 adds 1 to the variable N and stores the variable N in the data storage area 132 of the non-volatile storage device 130, for example. After the above, the present flow is ended.

The processor 110 of the management server 100 that executes the steps S101, S103, S127, S128, and S155 is an example of an automatic purchase limiting unit.

According to the present modification, since the number of times of automatic purchase is limited to a predetermined number, it is possible to prevent the automatic purchase of a plurality of times against a will of the user without permission caused by a large amount of printing performed by another unknown user without acknowledge of the original user, or unauthorized use by a malicious third party.

In the present modification, particularly, by monitoring the number of times of automatic purchase within a predetermined period and appropriately limiting the number of times of automatic purchase, it is possible to reliably prevent the automatic purchase against the will of the user.

Although not shown in FIG. 16, the number of printable sheets updated by executing auto-recharge and the completion notification of auto-recharge may be transmitted from the printer 200 to the terminal device 300 or from the management server 100 to the terminal device 300, and may be displayed on the auto-recharge completion screen.

(3) Others

The user may be able to set whether to enable the automatic purchase function of the number of printable sheets described in each of the above embodiments. When the automatic purchase function is enabled, automatic purchase of the number of printable sheets is executed when the threshold condition is satisfied, as described in each of the above embodiments. When the automatic purchase function is disabled, automatic purchase of the number of printable sheets is not executed even if the threshold condition is satisfied. The setting of enabling or disabling the automatic purchase function may be performed by, for example, operating on the auto-recharge setting screen 340H shown in FIG. 15B.

In the above description, the predetermined threshold condition is a condition that is satisfied when the number of printable sheets becomes equal to or less than the threshold, but the predetermined threshold condition is not limited thereto. For example, the predetermined threshold condition may be a condition that is satisfied after a certain period elapses. For example, a predetermined number of sheets to be recharged may be automatically purchased every 30 days. The predetermined threshold condition may be a combination of the number of printable sheets being equal to or less than the threshold and the elapse of a certain period.

At least one of the function of the processor 110 of the management server 100 and the function of the CPU 310 of the terminal device 300 described in each of the above embodiments may be executed by the processor 210 of the printer 200, for example. That is, in the present modification, the processor 210 of the printer 200 may execute the steps S10, S20, and S40 shown in FIG. 7, for example, or may execute the steps S130 to S140 shown in FIG. 8. In this case, the processor 210 of the printer 200 that executes the step S20 is an example of the threshold receiving unit. The processor 210 of the printer 200 that executes the step S130 is an example of the automatic purchasing unit, and the processor 210 of the printer 200 that executes the step S135 is an example of the allowable printing amount adding unit and the printing authority granting unit.

In the above description, an example in which printing is performed by an inkjet method has been described, but the present disclosure is not limited thereto. For example, a laser printer may be used instead of an inkjet printer. In addition to the printer 200, the printing apparatus according to the present disclosure can also be applied to multi-function peripherals, copiers, and the like.

In the above description, when there are descriptions such as "same", "equal", and "different" in terms of external dimensions and sizes, the descriptions do not have a strict meaning. That is, the terms "same", "equal", and "different" mean "substantially the same", "substantially equal", and "substantially different", with allowance for design and manufacturing tolerances and errors.

However, if there is a description of a value that serves as a predetermined judgment criterion or a value that serves as a delimiter, such as a threshold (see flowcharts in FIGS. 8, 10, 12, and 16) or a reference value, "same", "equal", "different", and the like have strict meanings, unlike the above.

The flowcharts shown in FIGS. 7 to 12, 14, 16, and the like do not limit the present disclosure to the procedure shown in the above flow, and addition or deletion of procedures, change of an order thereof, or the like may be made within a range not departing from a scope and a technical idea of the present disclosure.

In addition to the above, the methods according to the embodiment and the modifications may be appropriately combined and used.

In addition, although not shown, the present disclosure may be carried out with various modifications within a scope not departing from the spirit thereof

What is claimed is:

1. A printing authority management system comprising:
a terminal device comprising a display;
a printing apparatus configured to print an image on a sheet;
an information management device comprising:
 a communication interface configured to communicate with the printing apparatus and the terminal device via a network, and
 a controller configured to manage the printing apparatus and increase an allowable printing amount of the printing apparatus in accordance with a predetermined guaranteed printing amount guaranteed by a printing authority acquired from an expense of a user;
a storage that stores a threshold; and
one or more processors configured to:
 perform displaying processing to cause the terminal device to display, on the display of the terminal device, a recharge plan screen including recharge objects displayed as plans of manual recharge and an auto-recharge object displayed as a plan of auto-recharge;
 perform recharge receiving processing to receive a selection of one of: (a) the auto-recharge object and (b) one of the recharge objects, displayed on the display of the terminal device;
 after receiving the selection, perform automatic purchasing processing to execute automatic purchase of the printing authority in response to satisfaction of a threshold condition based on the threshold stored in the storage;
 perform printing authority granting processing to grant the printing authority automatically purchased by the automatic purchasing processing to the user or the printing apparatus; and
 perform allowable printing amount adding processing to add the guaranteed printing amount corresponding to the printing authority granted by the printing authority granting processing to the allowable printing amount of the printing apparatus.

2. The printing authority management system according to claim 1,
wherein the one or more processors are configured to further perform threshold receiving processing to receive setting of the threshold by the user,
wherein the storage stores the threshold in accordance with the setting received by the threshold receiving processing.

3. The printing authority management system according to claim 1,
wherein the threshold condition is a condition that is satisfied in a state where the allowable printing amount is equal to or less than a set threshold.

4. The printing authority management system according to claim 3,
wherein the one or more processors are configured to further perform threshold automatic setting processing to automatically set the threshold based on a decrease behavior of the allowable printing amount in a printing history of the user.

5. The printing authority management system according to claim 3,
wherein the one or more processors are configured, in the automatic purchasing processing, to execute the automatic purchase so that the allowable printing amount added with the guaranteed printing amount corresponding to the automatically purchased printing authority by the allowable printing amount adding processing becomes a predetermined value.

6. The printing authority management system according to claim 1,
wherein the one or more processors are configured to further perform automatic purchase limiting processing to limit a number of times of the automatic purchase executed by the automatic purchasing processing.

7. The printing authority management system according to claim 6,
wherein the one or more processors are configured, in the automatic purchase limiting processing, to limit the number of times of the automatic purchase executed within a predetermined period.

8. The printing authority management system according to claim 1,
wherein the one or more processors comprise a first processor provided in the printing apparatus and a second processor provided in the information management device,
wherein the storage is provided in the printing apparatus,
wherein the first processor of the printing apparatus is configured to perform first determination processing to determine whether the allowable printing amount is equal to or less than the threshold stored in the storage,
wherein the second processor of the information management device is configured to perform the automatic purchasing processing, and
wherein the second processor of the information management device is configured, in the automatic purchasing processing, to execute the automatic purchase of the printing authority in response to a determination in the first determination processing by the first processor of the printing apparatus that the allowable printing amount is equal to or less than the threshold.

9. The printing authority management system according to claim 8,
wherein the first processor of the printing apparatus is configured to further perform first notification transmission processing to transmit a first request notification requesting the automatic purchase to the information management device in response to the determination in the first determination processing that the allowable printing amount is equal to or less than the threshold, and
wherein the second processor of the information management device is configured, in the automatic purchasing processing, to execute the automatic purchase of the printing authority in response to receiving the first request notification transmitted from the printing apparatus by the first notification transmission processing.

10. The printing authority management system according to claim 1,
wherein the one or more processors comprise a second processor provided in the information management device,
wherein the storage is provided in the information management device, and
wherein the second processor of the information management device is configured to:
perform second determination processing to determine whether the allowable printing amount of the printing apparatus is equal to or less than the threshold stored in the storage; and
execute, in the automatic purchasing processing, the automatic purchase of the printing authority in response to a determination in the second determination processing that the allowable printing amount is equal to or less than the threshold.

11. The printing authority management system according to claim 10,
wherein the one or more processors comprise a first processor provided in the printing apparatus,
wherein the first processor of the printing apparatus is configured to perform first allowable printing amount transmission processing to transmit the allowable printing amount at a current point of time to the information management device at a predetermined interval, and
wherein the second processor of the information management device is configured, in the second determination processing, to determine whether the allowable printing amount is equal to or less than the threshold based on the allowable printing amount transmitted from the printing apparatus by the first allowable printing amount transmission processing.

12. The printing authority management system according to claim 1,
wherein the one or more processors comprise a second processor provided in the information management device and a third processor provided in the terminal device,
wherein the storage is provided in the terminal device,
wherein the third processor of the terminal device is configured to perform third determination processing to determine whether the allowable printing amount of the printing apparatus is equal to or less than the threshold stored in the storage,
wherein the second processor of the information management device is configured to perform the automatic purchasing processing, and
wherein the second processor of the information management device is configured, in the automatic purchasing processing, to execute the automatic purchase of the printing authority in response to a determination in the third determination processing that the allowable printing amount is equal to or less than the threshold.

13. The printing authority management system according to claim 12,
wherein the one or more processors comprise a first processor provided in the printing apparatus,
wherein the first processor of the printing apparatus is configured to further perform second allowable printing amount transmission processing to transmit, at a predetermined interval, the allowable printing amount at a current point of time to the terminal device, and
wherein the third processor of the terminal device is configured, in the third determination processing, to determine whether the allowable printing amount is equal to or less than the threshold based on the allowable printing amount transmitted from the printing apparatus by the second allowable printing amount transmission processing.

14. The printing authority management system according to claim 13,
wherein the third processor of the terminal device is configured to further perform second notification transmission processing to transmit a second request notification requesting the automatic purchase to the information management device in response to a determination in the third determination processing that the allowable printing amount is equal to or less than the threshold, and wherein the second processor of the information management device is configured, in the automatic purchasing processing, to execute the automatic purchase of the printing authority in response to receiving the second request notification transmitted from the terminal device by the second notification transmission processing.

* * * * *